(12) United States Patent
Baikerikar et al.

(10) Patent No.: US 7,955,696 B2
(45) Date of Patent: Jun. 7, 2011

(54) COMPOSITES AND METHODS FOR CONDUCTIVE TRANSPARENT SUBSTRATES

(75) Inventors: Kiran Baikerikar, Midland, MI (US); Syed Z. Mahdi, Rochester Hills, MI (US); Daniel L. Dermody, Midland, MI (US); Didem Oner-Deliormanh, Lake Orion, MI (US)

(73) Assignee: Dow Global Technologies LLC, Midland, MI (US)

( * ) Notice: Subject to any disclaimer, the term of this patent is extended or adjusted under 35 U.S.C. 154(b) by 703 days.

(21) Appl. No.: 11/959,208

(22) Filed: Dec. 18, 2007

(65) Prior Publication Data
US 2008/0152926 A1 Jun. 26, 2008

Related U.S. Application Data

(60) Provisional application No. 60/870,639, filed on Dec. 19, 2006.

(51) Int. Cl.
B32B 5/16 (2006.01)
(52) U.S. Cl. ............................ 428/328; 428/689; 522/99
(58) Field of Classification Search .................. 428/328, 428/689; 524/444, 589; 522/91, 99; 525/29, 525/301, 925
See application file for complete search history.

(56) References Cited

U.S. PATENT DOCUMENTS

| | | | |
|---|---|---|---|
| 3,152,162 A | 10/1964 | Fischer et al. | |
| 3,549,396 A | 12/1970 | Dietz | |
| 3,743,626 A | 7/1973 | Emmons | |
| 4,072,340 A | 2/1978 | Morgan | |
| 4,122,074 A | 10/1978 | Pepe et al. | |
| 4,232,088 A | 11/1980 | Humphrey, Jr. | |
| 4,367,313 A | 1/1983 | Rizk | |
| 4,374,210 A | 2/1983 | Ewen et al. | |
| 4,374,237 A | 2/1983 | Berger et al. | |
| 4,385,133 A | 5/1983 | Alberino et al. | |
| 4,394,491 A | 7/1983 | Hoffman | |
| 4,396,681 A | 8/1983 | Rizk et al. | |
| 4,496,611 A | 1/1985 | Kawakubo | |
| 4,522,975 A | 6/1985 | O'Conner et al. | |
| 4,526,811 A * | 7/1985 | Jialanella | 427/108 |
| 4,561,625 A | 12/1985 | Weaver | |
| 4,643,794 A | 2/1987 | Saracsan | |
| 4,672,100 A | 6/1987 | Schonbachler | |

(Continued)

FOREIGN PATENT DOCUMENTS

EP 414375 A 2/1993

(Continued)

OTHER PUBLICATIONS

Copending U.S. Appl. No. 12/033,420, filed Feb. 19, 2008 (U.S. Appl. No. 60/913,700, filed Apr. 24, 2007).

(Continued)

*Primary Examiner* — Timothy M Speer
*Assistant Examiner* — Lauren Robinson
(74) *Attorney, Agent, or Firm* — Dobrusin & Thennisch PC

(57) ABSTRACT

The present invention is directed to a conductive article and method of making the same that includes a substrate; a conductive composite including a conductive material in a matrix that includes one or more film forming resins having at least one functional group capable of polymerization; one or more adhesion promoters; and one or more compounds, which are reactive with the film forming resin and which also contain at least one acidic moiety.

27 Claims, 1 Drawing Sheet

U.S. PATENT DOCUMENTS

| | | | |
|---|---|---|---|
| 4,687,533 A | 8/1987 | Rizk et al. | |
| 4,688,752 A | 8/1987 | Barteck et al. | |
| 4,697,026 A * | 9/1987 | Lee et al. | 556/418 |
| 4,735,830 A | 4/1988 | Oezelli et al. | |
| 4,761,916 A | 8/1988 | Sanok et al. | |
| 4,777,191 A | 10/1988 | Komai et al. | |
| 4,780,520 A | 10/1988 | Rizk et al. | |
| 4,816,132 A | 3/1989 | Kotani et al. | |
| 4,835,012 A | 5/1989 | Saur | |
| 4,839,122 A * | 6/1989 | Weaver | 264/129 |
| 4,874,805 A | 10/1989 | Mulhaupt et al. | |
| 4,910,279 A | 3/1990 | Gillis et al. | |
| 4,912,306 A | 3/1990 | Grise et al. | |
| 4,950,581 A | 8/1990 | Koke et al. | |
| 4,963,614 A | 10/1990 | Ito et al. | |
| 4,970,244 A | 11/1990 | Komai et al. | |
| 4,999,136 A | 3/1991 | Su et al. | |
| 5,010,202 A | 4/1991 | Greco | |
| 5,063,269 A | 11/1991 | Hung | |
| 5,071,692 A | 12/1991 | Jourdaine | |
| 5,082,736 A | 1/1992 | Bravet et al. | |
| 5,114,989 A | 5/1992 | Elwell et al. | |
| 5,128,423 A | 7/1992 | Parrinello | |
| 5,139,307 A | 8/1992 | Koops et al. | |
| 5,167,899 A | 12/1992 | Jezic | |
| 5,279,882 A | 1/1994 | Daude et al. | |
| 5,368,943 A | 11/1994 | Baghdachi et al. | |
| 5,378,746 A | 1/1995 | Beyrle et al. | |
| 5,391,588 A | 2/1995 | Sakamoto | |
| 5,413,748 A | 5/1995 | Garza | |
| 5,466,727 A | 11/1995 | Hsieh | |
| 5,502,145 A | 3/1996 | Szum | |
| 5,529,655 A | 6/1996 | Bravet | |
| 5,554,217 A | 9/1996 | Bäbler | |
| 5,567,530 A | 10/1996 | Drujon et al. | |
| 5,603,798 A | 2/1997 | Bhat | |
| 5,623,044 A | 4/1997 | Chiao | |
| 5,637,363 A | 6/1997 | Leray et al. | |
| 5,664,041 A | 9/1997 | Szum | |
| 5,716,571 A | 2/1998 | LeLievre | |
| 5,795,501 A | 8/1998 | Kano | |
| 5,807,515 A | 9/1998 | Fisher et al. | |
| 5,840,428 A | 11/1998 | Blizzard | |
| 5,852,137 A | 12/1998 | Hsieh et al. | |
| 5,864,996 A | 2/1999 | Veldman et al. | |
| 5,915,780 A | 6/1999 | Kobrehel et al. | |
| 5,922,809 A | 7/1999 | Bhat et al. | |
| 5,948,927 A | 9/1999 | Gunther | |
| 5,976,305 A | 11/1999 | Bhat et al. | |
| 6,048,579 A | 4/2000 | Wang et al. | |
| 6,080,817 A | 6/2000 | Thieben et al. | |
| 6,126,737 A | 10/2000 | Mason | |
| 6,134,851 A | 10/2000 | Roze et al. | |
| 6,150,431 A | 11/2000 | Miller et al. | |
| 6,150,756 A | 11/2000 | Wakelkamp et al. | |
| 6,153,662 A | 11/2000 | Miller et al. | |
| 6,174,606 B1 | 1/2001 | Brusic et al. | |
| 6,228,433 B1 | 5/2001 | Witt | |
| 6,255,127 B1 | 7/2001 | Fujino et al. | |
| 6,290,881 B1 | 9/2001 | Krohn | |
| 6,302,681 B1 | 10/2001 | Douche et al. | |
| 6,306,924 B2 | 10/2001 | Szum | |
| 6,355,127 B1 | 3/2002 | Mahdi et al. | |
| 6,395,856 B1 | 5/2002 | Petty et al. | |
| 6,438,306 B1 | 8/2002 | Bishop | |
| 6,467,232 B1 | 10/2002 | Mackey | |
| 6,500,877 B1 | 12/2002 | Krohn | |
| 6,512,033 B1 | 1/2003 | Wu | |
| 6,596,445 B1 | 7/2003 | Matsumoto et al. | |
| 6,598,426 B2 | 7/2003 | Vandal et al. | |
| 6,623,791 B2 | 9/2003 | Sadvary et al. | |
| 6,649,016 B2 | 11/2003 | Wu et al. | |
| 6,653,394 B1 * | 11/2003 | Meisenburg et al. | 524/589 |
| 6,675,541 B2 | 1/2004 | Mackey | |
| 6,713,000 B2 | 3/2004 | Krohn | |
| 6,747,602 B2 | 6/2004 | Matsuoka et al. | |
| 6,784,223 B2 | 8/2004 | Krohn | |
| 6,797,746 B2 | 9/2004 | Cavazos-Gutierrez | |
| 6,803,001 B2 | 10/2004 | Ito et al. | |
| 6,875,470 B2 | 4/2005 | Trabesinger et al. | |
| 6,946,628 B2 | 9/2005 | Shirlin et al. | |
| 6,974,500 B2 | 12/2005 | Miyata et al. | |
| 6,984,287 B2 * | 1/2006 | Zhang | 156/331.4 |
| 7,022,748 B2 * | 4/2006 | Wilke et al. | 522/95 |
| 7,024,822 B2 | 4/2006 | Scheer et al. | |
| 7,087,127 B2 | 8/2006 | Mahdi et al. | |
| 7,119,129 B2 | 10/2006 | Krohn | |
| 7,122,289 B2 * | 10/2006 | Wilke et al. | 430/270.1 |
| 7,123,202 B2 | 10/2006 | Maeuser et al. | |
| 7,129,444 B2 | 10/2006 | Weiss | |
| 7,138,347 B2 | 11/2006 | Konno | |
| 2001/0041782 A1 | 11/2001 | Okuhira et al. | |
| 2002/0086914 A1 | 7/2002 | Lee et al. | |
| 2002/0092601 A1 | 7/2002 | Sweeney, Jr. | |
| 2003/0084955 A1 | 5/2003 | Smith et al. | |
| 2003/0100676 A1 | 5/2003 | Okuhira et al. | |
| 2003/0105230 A1 | 6/2003 | Hellmann | |
| 2004/0106718 A1 * | 6/2004 | Krohn | 524/444 |
| 2004/0191521 A1 | 9/2004 | Weiss et al. | |
| 2004/0239008 A1 | 12/2004 | Gottlieb et al. | |
| 2005/0045103 A1 | 3/2005 | Mikhael et al. | |
| 2005/0051536 A1 | 3/2005 | Shirlin et al. | |
| 2005/0081995 A1 | 4/2005 | Beckley | |
| 2005/0113484 A1 * | 5/2005 | Kamen et al. | 523/160 |
| 2005/0126414 A1 | 6/2005 | Weiss et al. | |
| 2005/0126683 A1 | 6/2005 | Hsieh | |
| 2005/0154076 A1 | 7/2005 | Bach | |
| 2006/0025496 A1 | 2/2006 | Gasman | |
| 2006/0191625 A1 | 8/2006 | Kapp et al. | |
| 2006/0198963 A1 * | 9/2006 | Chernyshov et al. | 427/487 |
| 2006/0287408 A1 | 12/2006 | Baikerikar et al. | |
| 2008/0268259 A1 | 10/2008 | Schmatloch | |
| 2008/0269452 A1 | 10/2008 | Schwoeppe | |

FOREIGN PATENT DOCUMENTS

| | | |
|---|---|---|
| EP | 592138 A | 4/1994 |
| EP | 0666290 A | 8/1995 |
| EP | 0687713 B1 | 10/1997 |
| EP | 1153090 | 12/2000 |
| EP | 1231241 | 8/2002 |
| EP | 1382625 A | 1/2004 |
| GB | 2113698 A | 8/1983 |
| GB | 2147244 | 5/1985 |
| GB | 2271308 | 4/1994 |
| GB | 2339571 B | 1/2003 |
| JP | 61-287476 A | 12/1986 |
| JP | 10036481 A | 2/1998 |
| JP | 2002012635 A | 1/2002 |
| JP | 2002/309163 A | 10/2002 |
| JP | 2002/309182 A | 10/2002 |
| JP | 2003/128988 A | 5/2003 |
| JP | 2003/226731 A | 8/2003 |
| JP | 2003/336008 A | 11/2003 |
| JP | 2004168957 A | 6/2004 |
| JP | 2007063551 A | 3/2007 |
| WO | 93/12935 A1 | 7/1993 |
| WO | 99/31191 A1 | 6/1999 |
| WO | 00/00530 A1 | 1/2000 |
| WO | 00/06512 A1 | 2/2000 |
| WO | 01/44381 A1 | 6/2001 |
| WO | 01/47644 A1 | 7/2001 |
| WO | 01/51567 A1 | 7/2001 |
| WO | 01/77245 A2 | 10/2001 |
| WO | 2005/040055 A1 | 10/2004 |
| WO | 2005/003048 A1 | 1/2005 |
| WO | 2006/042305 A1 | 4/2006 |
| WO | 2006/093671 A2 | 9/2006 |
| WO | 2007/002328 A | 1/2007 |
| WO | 2008/036721 A | 3/2008 |
| WO | 2008/045726 A | 4/2008 |

OTHER PUBLICATIONS

Copending U.S. Appl. No. 12/035,770 (U.S. Appl. No. 60/949,369, filed Dec. 18, 2007).

Copending U.S. Appl. No. 11/958,983 (U.S. Appl. No. 60/870,643, filed Dec. 18, 2007).
Copending U.S. Appl. No. 11/959,107 (U.S. Appl. No. 60/870,641, filed Dec. 18, 2007).
Copending U.S. Appl. No. 12/041,915 (U.S. Appl. No. 60/913,703, filed Mar. 4, 2008).
Copending U.S. Appl. No. 12/033,447 (U.S. Appl. No. 60/913,706, filed Feb. 19, 2008).

Copending U.S. Appl. No. 61/014,547, filed Dec. 18, 2007, by Baikerikar et al., "Protective Coating for Window Glass Having Enhanced Adhesion to Glass Bonding Adhesives."
International Search Report, International application No. PCT/US2007/087977, dated May 28, 2008.

* cited by examiner

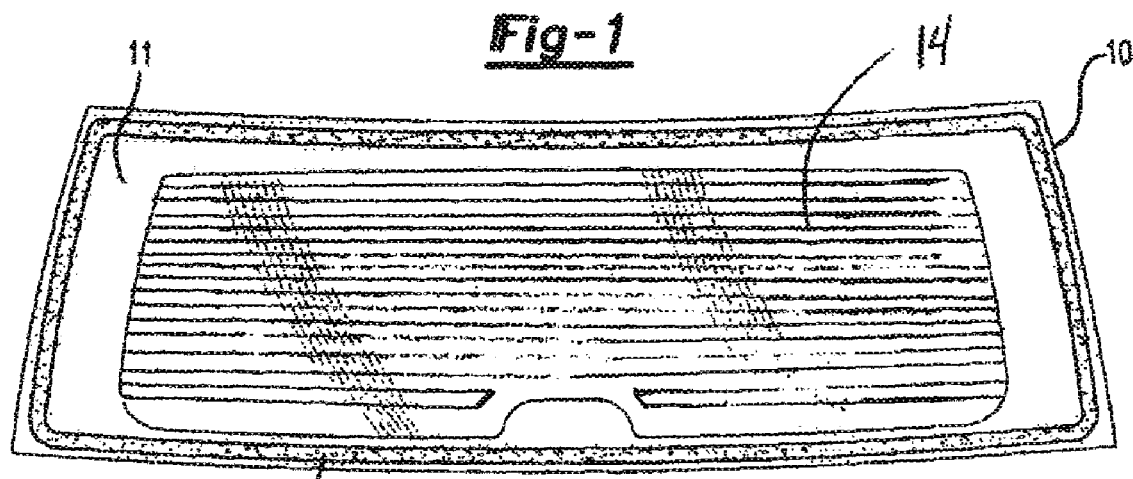
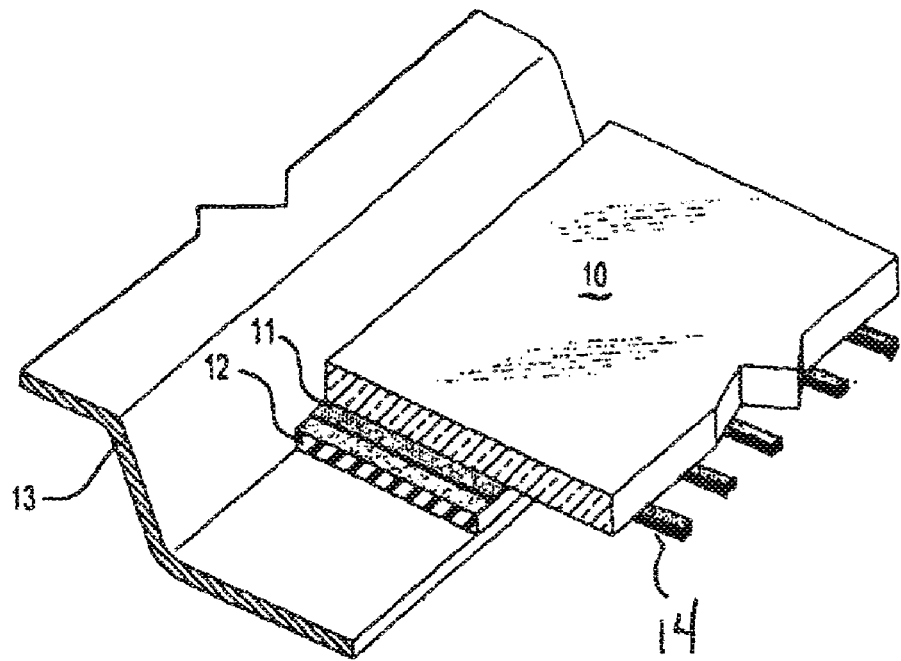

COMPOSITES AND METHODS FOR CONDUCTIVE TRANSPARENT SUBSTRATES

CLAIM OF PRIORITY

The present application claims the benefit of the filing date of Provisional Application No. 60/870,639 (filed Dec. 19, 2006), the contents of which are hereby incorporated by reference in their entirety.

FIELD OF THE INVENTION

This invention relates to conductive composite articles, and particularly to transparent substrates having a conductive composite layer selectively applied to a surface of the substrate, such as for heating a window.

BACKGROUND OF THE INVENTION

In the field of automotive glass applications, one approach for making a defogger for a window is to apply a coating with conductive particles to a glass substrate and then fire the materials for securing the conductive particles in conductive electrical communication with each other. See, e.g., U.S. Pat. Nos. 7,138,347 and 5,795,501 (both incorporated by reference). This places potential restrictions upon the use of certain materials. For example, many transparent plastics will not withstand extreme conditions encountered during firing. In addition, with the costs and availability of energy resources for heating continuing to increase, it is desirable to reduce dependency upon energy intensive processes. In addition, many applications employ ceramic frit structures, such as in locations about their perimeters. Any such step of selectively applying a conductive layer to the substrate requires processing constraints for protecting the frit.

It is therefore desirable to have methods, compositions, and articles for realizing conductive substrates, particularly transparent substrates that can be manufactured easily without the need to subject the materials to extreme processing conditions.

One example of an effort to address improvements to window heaters is described in U.S. Pat. No. 7,129,444, incorporated by reference, which features grid lines made by dispersing a conductive metal in a polymeric matrix, particularly one that includes "an epoxy resin, a polyester resin, a polyvinyl acetate resin, a polyvinylchloride resin, a polyurethane resin or mixtures and copolymers of the like". The examples address heat curing a heater grid onto a plastic window.

Ultraviolet (UV) curable compositions for use as heating elements are described in U.S. Pat. No. 6,946,628 (incorporated by reference). U.S. Pat. No. 6,174,606 (incorporated by reference) addresses a conductive composite including silver particles. U.S. Pat. No. 4,526,811, incorporated by reference, addresses a method to repair metal lines of window defoggers using a composition that "comprises (a) an acrylic ester polymer resin (b) a metallic pigment and (c) an organic pigment". Other patents of potential interest include U.S. Pat. Nos. 6,290,881 and 6,713,000 (both incorporated by reference), which pertain to ultraviolet (UV) curable silver compositions. Examples of UV curable compositions include those in U.S. Pat. Nos. 7,119,129 and 6,784,223; both incorporated by reference. See also, U.S. Pat. Nos. 5,071,692; and 4,232,088, incorporated by reference.

SUMMARY OF THE INVENTION

The present invention generally is predicated upon the application of a conductive composite to a substrate and the subsequent long-term or permanent retention of the composite to the substrate, such as by way of a polymeric matrix material, and particularly one that is UV curable. In one of its more particular aspects, the invention pertains to a method and articles that contemplate a substrate and a polymeric-containing conductive composite selectively being applied to at least one surface of the substrate. The conductive composite includes a plurality of particulates of a conductive material being in electrical communication with each other and being fixed relative to each other with a polymeric matrix that includes: a) one or more film forming resins having at least one functional group capable of polymerization; b) one or more reactive diluents capable of reacting with the film forming resin; c) optionally one or more compounds capable of promoting adhesion of the composition to glass; d) optionally one or more fillers capable of imparting abrasion resistance to the composition when polymerized; and e) one or more compounds which is reactive with the film forming resin which also contains at least one acidic moiety.

In another aspect, the invention is directed to methods and articles that contemplate a substrate, and a conductive polymeric and metal (e.g., noble metal) composite being applied on at least one surface of the substrate. The composite includes a plurality of particulates of a conductive metal being in electrical communication with each other and being fixed relative to each other with a matrix that includes a (meth)acrylate and a functionality including silicon.

In still another specific aspect, the invention is directed to methods and articles that contemplate a transparent substrate selected from a glass, a plastic or a combination thereof; and a conductive polymeric electrode and silver composite coating on at least one surface of the substrate, the polymeric and silver composite coating including a plurality of silver particulates in electrical communication with each other and being fixed relative to each other with a matrix that includes a (meth)acrylate moiety and a high molecular weight adhesion promoter having multiple alkoxysilanes.

In one specific aspect, the methods and articles herein contemplate that the composite coating is substantially free of lead. Other variations of the above are contemplated as well, as will be appreciated from a review of the following detailed description. It will be seen that the present invention has the potential to afford various benefits, including one or more of the avoidance of high temperature firing steps (e.g., the present invention avoids the need to subject the composite or substrate to a firing step in excess of about 600° C., more specifically in excess of about 400° C., and still more specifically in excess of about 250° C., or another temperature that would degrade the material such as by decomposition, melting or otherwise), the reduction of overall steps, the avoidance of special high temperature handling steps for additional ceramic coatings applied to the substrate, the ability to selectively apply a conductive composite using relatively low cost application techniques (e.g., screen printing, ink-jet printing, or the like), the ability to thermally deform substrates after the application of the conductive composite, or any combination thereof. Resulting articles are capable of exhibiting excellent long-term electrical and/or thermal performance, in one or more particular respects, such as relatively rapid defogging in accordance with SAE J953, abrasion resistance, conductivity, thermal stability, hydrolytic stability, light stability, resistivity, or any combination thereof.

DESCRIPTION OF THE DRAWINGS

FIG. 1 illustrates window glass with a conductive composite pattern on the window.

FIG. 2 is a perspective sectional view of a panel that includes a conductive composite.

DETAILED DESCRIPTION

As used herein, all parts by weight are based on 100 parts by weight of the recited base material or composition. In a case of the conductive composite composition, this means the weights are based on 100 parts by weight of the overall composite composition. In the case of the polymeric matrix, this means the weights are based on 100 parts by weight of the overall matrix composition. It will be appreciated that concentrates or dilutions of the amounts recited herein may be employed. In general, the relative proportions of the ingredients recited will remain the same. Thus, by way of example, if the teachings call for 30 parts by weight of a Component A, and 10 parts by weight of a Component B, the skilled artisan will recognize that such teachings also constitute a teaching of the use of Component A and Component B in a relative ratio of 3:1.

In general, the present invention includes methods and articles that employ a conductive composite, wherein particulates of a conductive material are dispersed in electrical communication with each other in a polymeric matrix. The conductive composite is applied to a substrate and the polymeric matrix phase cured such that the composite maintains a tenacious bond to the underlying substrate and also exhibits excellent long-term stability and heat generating capability.

The substrates herein, in one particular aspect, may be transparent (i.e., optically transparent) over at least a portion of its volume. For example, because the invention herein is particularly useful for imparting conductivity to a window or other panel (e.g., an automotive windshield, backlight, sidelight, light lens, mirror, sun roof, gauge lens, or the like), typically, the substrates will be panels that are transparent through at least one surface, and particularly through both opposing surfaces, over at least about 25% of the area of the surface, and more specifically, at least a majority (e.g., at least about 60%, 75% or even 90% of the area of the surface).

The substrates herein generally will be made from a substantially amorphous material, and particularly an amorphous ceramic (such as glass), a plastic, or a combination thereof. Without limitation, examples of suitable substrate materials include poly(meth)acrylates, polycarbonates, vinyls, polyesters (e.g., oriented polyesters), polyimides, polyolefins, polyamides, glass, any combinations thereof (e.g. a laminated glass), or the like. In a particular example, the substrates include or even consist essentially of a material selected from glass, poly(meth)acrylates, polycarbonates or any combination thereof. Illustrative materials are also described at cols. 11-12 of U.S. Pat. No. 7,129,444 (incorporated by reference).

The substrates herein typically will include at least one surface onto which the conductive composite is applied. The surface may optionally be treated for improving the bond strength of the composite to the substrate, e.g. by a primer, a flame spray, a corona treatment, a plasma treatment, or some other surface treatment. However, in one specific example, the outer surface is substantially free of any surface treatment. Accordingly, upon application, the conductive composite is in direct intimate contact with the substrate and particularly in the substantial absence of any intermediate layer. Of course, after applying the composite to the substrate it is also possible to apply over some or all of one or both of the composite and substrate a further layer (e.g., a silicone, an acrylic, a polyurethane, or otherwise, for realizing a protective over-layer), such as is disclosed in columns 12-14 of U.S. Pat. No. 7,129,444 (incorporated by reference). It is also possible that the composite herein may be employed over, beneath and/or adjacent a frit (e.g., a frit of the type taught in co-pending application Ser. No. 11/472,119 filed Jun. 20, 2006 (priority to 60/692,318 filed Jun. 20, 2005), by Baikerikar et al. (incorporated by reference).

When applied, the conductive composite generally will have a thickness of up to about 250 microns or higher. More commonly it will be less than about 150 microns, less than about 100 microns. Desirably the size of any particulates of the conductive material in the conductive composite will be less than the thickness of any layer of conductive composite.

Though some applications may call for the coating of substantially an entire surface of a substrate with the conductive composites herein, ordinarily the composites will be applied to the substrates selectively, according to a predetermined pattern (e.g., for defining an antenna, a heater, or otherwise). It is expected that the composites will be applied for defining one or more lines, curves or other geometric configurations comprising segments of constant or varying width, height, length or other dimension. The segments may be arranged for defining a suitable pattern that may further comprise one or more buss bars, terminals for electrical connections or other features for defining one or more electrical circuits. For example, it is possible that segments will be arranged as grid lines (e.g., a plurality of substantially parallel lines), a serpentine pattern, interdigitating stripes, or otherwise. Examples of configurations are described in U.S. Pat. No. 7,129,444 (incorporated by reference). For an antenna, it is possible that a design may employ art-disclosed teachings such as without limitation, those in U.S. Pat. Nos. 6,747,602, or 7,123,202 (incorporated by reference).

The conductive composite herein is characterized as including particulates of a conductive material, and specifically a metallic conductor. As such, conductive forms of carbon (e.g., carbon black), certain conductive polymers, or other generally non-metallic conductors are possible as conductive material or in combination with other conductive material such as metallic conductors. A particularly desirable approach is to employ conductive metals, and still more specifically conductive noble metals. Thus, without limitation, specific examples of suitable metals are selected from gold, silver, copper, zinc, aluminum, magnesium, nickel, tin, palladium, platinum, any combination thereof, or the like; and more particularly, gold, silver, platinum or any combination thereof. An especially attractive metal for use herein includes silver (in its substantially pure form, or as part of an alloy or compound). Though the metals ordinarily will be employed alone in elemental format, or in combination as an alloy, conductive compounds that include the foregoing metals are also contemplated among the suitable metals. The conductive particles such as copper, nickel, or silver coated particles are commercially available under the name Conduct-o-Fil from Potters Industries Inc., and as Silflake, Silpowder, Silphere, SilCopowder, SilCoflake, SilGlass, CoSiGlass, and MicroFlake, from Technic, Inc.

Though not necessarily a most preferred embodiment, one aspect of the invention calls for the conductive material to be one or a plurality of conductive wires that are encased with the polymeric matrix composition as described herein. The conductive material more typically will be in the form of a particulate. For example, the conductive material may be selected from a whisker, a filament, a powder, a flake, any combination thereof or some other form of particulate. The conductive material may be substantially solid or porous. Individual particles may be shaped with one or more rounded surfaces, flat surfaces, convex surfaces, concave surfaces, or any combination thereof. They may be substantially spherical, elongated, prismatic, or any combination thereof. The particulates will normally have a population that has at least about 20% and still more specifically at least about 50% of the total particles exhibiting an average largest cross-spanning dimension (e.g., the largest dimension measurable across the particle, such as length, diameter or otherwise). For example, though not required, the largest cross-spanning dimension of the particle may be less than about 150 microns, more specifically less than about 100 microns, still more specifically less than about 75 microns, and even still more specifically less than about 50 microns (e.g., about 15 microns or smaller). However, it is contemplated that the largest cross spanning dimension may be greater than about 150 microns. In one embodiment, it is possible that at least about 20% of the weight of the conductive material includes particulates having a largest cross-spanning dimension of less than 0.1 microns. Thus, it is seen that the particles herein contemplate the employment of nanoparticles. It should be realized as well that for certain embodiments, such as when a conductive filament is employed, the diameter may fall within the above ranges for largest cross-spanning dimension, but have a length that is greater than the diameter. Thus, for example, particulates will normally have a population that has at least 20% and still more specifically at least about 50% of the total particles of the composites herein may have an average aspect ratio (the ratio of the largest cross-spanning dimension to the smallest cross spanning dimension) of about 1:1 to as high as about 50:1, even about 100:1. For example, the ratio may range from about 1:1 to about 10:1 of the largest cross-spanning dimension to the smallest cross-spanning dimension.

The conductive material in the conductive composites herein generally will range from about 10 to about 95% by weight of the overall composite material. More specifically, the conductive composite material will include conductive particles in an amount of at least about 50% by weight of the overall composite material. For example, the conductive composite material will include conductive particles in an amount of at least about 70% by weight of the overall composite material, or even greater than about 85% by weight of the overall composite material. Preferably, the relative amounts in parts by weight of the conductive material relative to the matrix will be greater than about 2:1, and more preferably greater than about 4:1.

The conductive composite will generally include or consist essentially of the conductive material (e.g., in the form of particulates, such as those described above), and an organic matrix (particularly a polymeric matrix, e.g., an optically clear or opaque matrix). The distribution may be substantially uniform, random or according to a predetermined arrangement (e.g., according to a predetermined concentration gradient). For example, a portion of the composite may have a low volume of particulates, but one or more adjoining portions may have a substantially higher volume. It is also possible that one region will include a concentration of one or more forms of particulates (e.g., flake or powders) that differs relative to the concentration or forms of particulates in another region. One preferred silver powder or combination of silver powder and flake is commercially available from Sigma Aldrich.

Mixtures of different particulate forms are contemplated. For example, one approach is to employ a combination of at least two particulate forms selected from a whisker, a filament, a powder, a flake, any combination thereof or some other form of particulate. When two forms of particulates are employed (e.g., "Form 1" and "Form 2") they may be in substantially equal portions, or a minor portion of one and a major portion of the other. For example, the forms may be present from about 1 part Form 1 to about 99 parts Form 2. The forms may be present from about 1 part Form 1 to about 9 parts Form 2. The forms may be present from about 3 parts Form 1 to about 7 parts Form 2.

For a particular aspect of the invention, the organic matrix is one that is capable of being applied to a substrate as a liquid, a paste or a combination thereof. Thereafter, it hardens, and also bonds to the substrate, while maintaining the particulates of the conductive composite in fixed relation relative to each other and the substrate, and preferably rendering the composite generally abrasion resistant, thermally stable, and light stable such that it may be advantageously employed in environments common for automotive applications. In addition, the matrix generally will form a barrier for protecting a substantial portion of the conductive material dispersed therein from humidity or other corrosive conditions that potentially may impair the conductive properties. Desirably, the matrix also substantially protects and preserves the morphology of the conductive material. In this regard, for example, it is also contemplated that the composites herein may employ a surface portion, or even a layer, of the matrix that may include a content of conductive material, (e.g., a relatively low content of conductive material), or may be substantially free of the conductive material.

One preferred organic matrix preferably includes one or more film forming resins having at least one functional group capable of polymerization; one or more reactive diluents capable of reacting with the film forming resin; one or more compounds capable of promoting adhesion of the composition; and one or more compounds which is reactive with the film forming resin which also contains at least one acidic moiety.

Turning first to the film forming resin, generally it will contain one or more moieties able to polymerize, curing to form a continuous matrix and which is resistant to many environmental forces. In a preferred embodiment, preferably the film-forming resin polymerizes when exposed to free radicals or to cationic reaction conditions. In one specific aspect, the film-forming resin is a resin curable by exposure to irradiation, such as UV radiation or an electron beam. The film-forming resin may contain functional groups which polymerize when exposed to free radicals, such as vinyl, acrylate, styrenic, diene, methacrylate, allyl, thiolene, vinyl ether, unsaturated ester, imide, N-vinyl, acrylamide containing moieties, mixtures thereof or the like. In a more preferred embodiment, the functional groups on the film-forming resin are acrylic and/or methacrylic moieties. In many embodiments, the film-forming resin is an oligomer or prepolymer having the described functional moieties. Among preferred types of oligomers and prepolymers are urethane acrylates, such as aliphatic and aromatic urethane acrylates, epoxy acrylates, melamine acrylates, polyester acrylates, polyether acrylates, silicone acrylates, dendritic acrylates, polybutadiene acrylates, amine or amido acrylates, acrylic acrylates, metallic acrylates (i.e. zinc containing acrylates), amido acrylates, chlorinated polyester acrylates, allylic oligomers, anhydride/carboxylic acid-containing aromatic acid acrylate/methacrylate half ester oligomers, hyperbranched acrylates, imide/ester/amide-containing acrylates self-initiating oligomers (e.g., oligomers that use small amounts or substantially no photoinitiator), acrylated phenoxy oligomers, acrylamidomethyl substituted cellulose esters, dual-functional acrylated oligomers (i.e. containing acrylates and either hydroxyl, isocyanate, carboxylic acid, anhydride, or epoxy groups), and spiro ortho carbonate esters or mixtures thereof. One specific class of oligomers and prepolymers includes aliphatic urethane acrylates, commercial examples of which include those from Cytec Surface Specialties under the trademark EBECRYL and designations 264, 265, 284N, 1290, 4866, 8210, 8301, 8402, 8405, 5129 and 8411; those available from Sartomer under the designations CN985B88, 964, 944B85, 963B80, CN 929, CN 996, CN 968, CN 980, CN 981, CN 982B90, CN 983, CN991; CN 2920, CN 2921, CN 9006, CN 9008, CN 9009, CN 9010, CN 964A85, CN 9001, CN 2920; GENOMER 4302, 4316, and UA 00-022 available from Rahn; PHOTOMER 6892 and 6008 available from Cognis; NK OLIGO™ U24A and U-15HA, and U-324A™ available from Kowa. Additional suppliers of aliphatic urethane acrylates include the BR series of aliphatic urethane acrylates such as BR 144 or 970 available from Bomar Specialties or the LAROMER series of aliphatic urethane acrylates, such as LAROMER 8987 from BASF.

The film-forming resin is present in an amount of about 10 parts by weight or greater and more preferably about 15 parts by weight or greater, based on the weight of the matrix composition. Preferably, the film-forming resin is present in the composition in an amount of about 70 parts by weight or less based on the weight of the matrix composition and more preferably about 60 parts by weight or less, more preferably about 50 parts by weight or less and most preferably 40 parts by weight or less of the matrix.

The composition optionally may further comprise a reactive diluent in sufficient amounts to achieve the desired viscosity. The reactive diluent may be monofunctional or polyfunctional, as those terms are described in co-pending application Ser. No. 11/472,119 filed Jun. 20, 2006 (priority to 60/692,318 filed Jun. 20, 2005), by Baikerikar et al. (incorporated by reference). Preferably, the reactive diluent has unsaturated compounds which polymerize when exposed to free radicals or compounds which react via cationic reaction mechanisms. Examples of functional moieties which may be used in the reactive diluent include vinyl, acrylate, styrenic, diene, methacrylate, allyl, acrylamide, methacrylamide, cycloaliphatic epoxide, alpha epoxide, acrylonitrile, and methacrylonitrile containing moieties, combinations thereof or the like. Preferred functional groups are those functional groups which polymerize when exposed to free radicals. Among preferred functional groups which polymerize when exposed to free radicals are vinyl, acrylate, styrenic, diene, methacrylate, and allyl containing moiety, combinations thereof and the like. Representative examples of monofunctional reactive diluents useful include styrene, alpha-methylstyrene, substituted styrene, vinyl ester, vinyl ether, N-vinyl-2-pyrrolidone, (meth)acrylamide, N-substituted (meth)acrylamide, octyl (meth)acrylate, nonylphenol ethoxylate (meth)acrylate, isononyl (meth) acrylate, isobornyl (meth) acrylate, 2-(2-ethoxyethoxy)ethyl (meth)acrylate, 2-ethylhexyl (meth)acrylate, lauryl (meth)acrylate, beta-carboxyethyl (meth)acrylate, isobutyl (meth)acrylate, 3,3,5-trimethylcyclohexyl (meth)acrylate, cyclic trimethylolpropane formal (meth)acrylate, cycloaliphatic epoxide, alpha-epoxide, 2-hydroxyethyl (meth)acrylate, (meth)acrylonitrile, maleic anhydride, itaconic acid, isodecyl (meth)acrylate, dodecyl (meth)acrylate, n-butyl (meth)acrylate, methyl (meth)acrylate, hexyl (meth)acrylate, (meth) acrylic acid, N-vinylcaprolactam, N-vinylformamide, stearyl (meth)acrylate, hydroxy functional caprolactone ester (meth) acrylate, isooctyl (meth)acrylate, hydroxyethyl (meth)acrylate, hydroxymethyl (meth)acrylate, hydroxypropyl (meth) acrylate, hydroxyisopropyl (meth)acrylate, hydroxybutyl (meth)acrylate, hydroxyisobutyl (meth)acrylate, tetrahydrofurfuryl (meth)acrylate, combinations of these, and the like. In one preferred embodiment, the reactive diluent is a monofunctional acrylate. Among preferred monofunctional acrylates are 2-(2-oxy)ethyl acrylate, 2(2-ethoxyethoxy)ethyl acrylate, 2-phenoxy ethyl acrylate, hydroxylethyl acrylate, other long chain alkyl acrylates, isobornyl acrylate, cyclic trimethylol propane formal acrylate, 3,3,5-trimethylcyclohexyl (meth)acrylate, monofunctional aliphatic urethane acrylates, mixtures thereof and the like. In a more preferred embodiment, the reactive diluent is a polyacrylate. Examples of polyacrylate reactive diluents include ethylene glycol di(meth)acrylate, hexanediol di(meth)acrylate, nonanediol di(meth)acrylate, butylene glycol di(meth)acrylate, triethylene glycol di(meth)acrylate, tetraethylene glycol di(meth) acrylate, dipropylene glycol di(meth)acrylate, trimethylolpropane tri(meth)acrylate, ethoxylated trimethylolpropane tri (meth)acrylate, glycerol tri(meth)acrylate, pentaerythritol tri (meth)acrylate, pentaerythritol tetra(meth)acrylate, tris (2-hydroxyl-ethyl)isocyanurate triacrylate ditrimethylolpropane tetra(meth)acrylate, and alkoxylated polyol derived di or polyacrylates, such as propoxylated neopentyl glycol diacrylate or propoxylated glycerol triacrylate, neopentyl glycol di(meth)acrylate, combinations of these, and the like. Preferred reactive diluents are diacrylates such as 1,6 hexanediol diacrylate, 1,9 nonanediol diacrylate, 1,4 butanediol acrylate, tricyclodecane dimethanol diacrylate, cyclohexane dimethanol diacrylate, cis/trans 1,3/1,4 cyclohexanedimethanol diacrylate, alkoxylated cyclohexane dimethanol diacrylates, tripropylene glycol diacrylate and the like. More preferred reactive diluents include propoxylated neopentyl glycol diacrylate, propoxylated glyceryl triacrylate and tripropylene glycol diacrylate. Among the most preferred monofunctional acrylate monomers is isobornyl acrylate.

Preferably, the reactive diluent is present in an amount of about 2, more preferably about 5 and still more preferably about 10 parts by weight or greater, based on the weight of the polymer matrix. The reactive diluent is preferably present in an amount of about 30, more preferable about 25 and still more preferably about 20 parts by weight or less, based on the weight of the polymer matrix.

In a preferred embodiment, a mixture of reactive diluents may be used, such as a blend of monofunctional, difunctional, and trifunctional diluents. Preferably, in such instance, any reactive diluent with a functionality of greater than 2 is present in an amount of about 1 part by weight of the composite or greater, more preferably about 3 parts by weight or greater and most preferably about 4 parts by weight or greater. Preferably, the reactive diluent having a functionality greater than 2 is present in an amount of about 15 parts by weight or less and more preferably about 12 parts by weight or less and most preferably about 10 parts by weight or less of the composite.

The composition may further contain one or more adhesion promoters, as described in co-pending application Ser. No. 11/472,119 filed Jun. 20, 2006 (priority to 60/692,318 filed Jun. 20, 2005), by Baikerikar et al. capable of enhancing the bonding of the matrix composition to glass, plastic and/or an isocyanate or siloxy functional adhesive. Adhesion promoters, in a non-limiting embodiment, can be monomers, oligomers and/or polymers. Such materials include, but are not limited to, organometallics such as silanes, (e.g., mercapto silanes, acrylate or methacrylate functional silanes, vinyl silanes, amino silanes, epoxy silanes, isocyanate silanes, fluoro silanes, and alkyl silanes), titanates, zirconates, aluminates, metal containing compounds, zirconium aluminates, hydrolysates thereof and mixtures thereof. In one aspect, they may include a compound including at least one terminal unsaturation (e.g., an acrylate group) and multiple alkoxysilyl groups.

The adhesion promotion additive may be synthesized by any of a number of reactions. Thus, the adhesion promotion additive may be prepared by a reaction of a first compound including at least one terminal unsaturation (e.g., an acrylate) and a second compound including one or more silylated groups (e.g., multiple alkoxysilyl groups). By way of example, the adhesion promotion additive may be the reaction product of a first compound including silicon and a moiety selected from at least one of a mercapto group, an amino group, an epoxy group, a hydroxyl group, a sulfoethyl group, an isocyanate group, a (meth)acrylate group, or any combination thereof, with a second compound including a moiety selected from at least one of an isocyanate group, a hydroxyl group, a carboxyl group, a mercapto group, an epoxy group, an acetoacetoxy group, a (meth)acrylate group, and amino group, or any combination thereof. By way of more specific examples, one or more of the following synthesis reactions may be suitably employed for preparing the adhesion promotion additive:

a. mercapto silane+isocyanate functional acrylate or methacrylate (e.g., so as to include a reaction between —SH and —NCO)

b. amino silane+isocyanate functional acrylate or methacrylate (e.g., so as to include a reaction between —NH or —NH2 with —NCO)

c. isocyanate silane+hydroxyl functional acrylate or methacrylate (e.g., so as to include a reaction between —NCO and —OH)

d. epoxy silane+amine functional acrylate or methacrylate (e.g., so as to include a reaction between epoxy and amine)

e. epoxy silane+carboxylic acid functional acrylate or methacrylate (e.g., so as to include a reaction between epoxy and —COOH)

f. mercapto acid+isocyanate functional acrylate or methacrylate (e.g., so as to include a reaction between —NCO with either/both —SH or —COOH)

g. Michael addition of amino silane+carboxylic acid functional acrylate or methacrylate (e.g., so as to include a reaction between the terminal double bond and amine; thus the product would contain both alkoxysilyl and —COOH functionality with a terminal acrylate in the same molecule);

h. amino silane+epoxy functional (meth)acrylate or methacrylate, such as glycidyl methacrylate (e.g., so as to include a reaction between epoxy and amine)

i. isocyanate silane+amine acrylate or methacrylate (e.g., so as to include a reaction between —NH or —NH2 with —NCO)

j. 2-sulfoethyl acrylate or methacrylate+isocyanate silane (e.g., so as to include a reaction between —SO2OH+—NCO)

k. hydroxy silane+isocyanate functional acrylate or methacrylate (e.g., so as to include a reaction between —NCO and —OH)

l. mercapto silane+epoxy functional (meth)acrylate such as glycidyl methacrylate (e.g., so as to include a reaction between —SH with epoxy)

m. epoxy silane+hydroxyl functional (meth)acrylate (e.g., so as to include a reaction between epoxy and —OH)

n. hydroxy silane+epoxy functional (meth)acrylate (e.g., so as to include a reaction between —OH with epoxy)

o. isocyanate silane+acetoacetoxy functional (meth)acrylate (e.g. so as to include a reaction between —NCO and active methylene group of acetoacetoxy functionality)

p. amino silane+acetoacetoxy functional (meth)acrylate (e.g. so as to include a reaction between amine and carbonyl group of acetoacetoxy functionality)

q. meth(acrylate) silane+acetoacetoxy functional (meth)acrylate (e.g. so as to include a Michael reaction between unsaturation from silane with active methylene group of acetoacetoxy functionality);

r. hydroxyl silane+carboxylic acid functional (meth)acrylate (e.g. so as to include a reaction between hydroxyl and carboxylic acid).

s. amino silane+polyacrylates (e.g. so as to include a Michael reaction between amine and acrylate); or t. amino silane+acryloyl or methacryloyl chloride (e.g. so as to include a reaction between an amine and chlorine to form an amide);

u. amino silane+carboxylic acid functional (meth)acrylate (e.g. so as to include a reaction between an amine and carboxylic acid to form an amide); or v. any combination of the foregoing.

Examples of titanate, zirconate or zircoaluminate adhesion promoters useful in this invention include those described in Wu et al., U.S. Pat. No. 6,649,016, column 7, line 23 to column 8, line 53, incorporated herein by reference. Preferred titanium adhesion promoters include those commercially available under the TYZOR name from DuPont or tetra (2,2diallyoxymethyl)butyl, di(ditridecyl)phosphito titanate (e.g., KR 55, from Kenrich Petrochemicals, Inc.); neopentyl (diallyl) oxy, trineodecanonyl titanate; neopentyl(diallyl) oxy, tri(dodecyl)benzene-sulfonyl titanate; neopentyl(diallyl)oxy, tri(dioctyl)phosphato titanate; neopentyl(diallyl) oxy, tri(dioctyl)pyro-phosphato titanate; neopentyl(diallyl)oxy, tri(N-ethylenediamino)ethyl titanate; neopentyl(diallyl)oxy, tri(m-amino)phenyl titanate; neopentyl(diallyl)oxy, trihydroxy caproyl titanate; isopropyldimethylacrylisosteroyl titanate; tetraisopropyl(dioctyl) phosphito titanate; at least partial hydrolysates thereof or mixtures thereof.

Preferred zirconium adhesion promoters include zircon aluminates. Non-limiting examples of zirconate adhesion promoters include tetra (2,2 diallyloxymethyl)butyl, di(ditridecyl)phosphito zirconate (commercially available as KZ 55 from Kenrich Petrochemicals, Inc.); neopentyl(diallyl) oxy, trineodecanoyl zirconate; neopentyl(diallyl) oxy, tri(dodecyl)benzene-sulfonyl zirconate; neopentyl(diallyl) oxy, tri(dioctyl)phosphato zirconate; neopentyl(diallyl)oxy, tri(dioctyl)-pyrophosphato zirconate neopentyl(diallyl)oxy, tri(N-ethylenediamino)ethyl zirconate; neopentyl(diallyl) oxy, tri(m-amino)phenyl zirconate; neopentyl(diallyl)oxy, trimethacryl zirconate; neopentyl(diallyl)oxy, triacryl zirconate; dineopentyl(diallyl)oxy, diparamino benzoyl zirconate; dineopentyl(diallyl)oxy, di(3-mercapto)propionic zirconate; at least partial hydrolysates thereof or mixtures thereof.

The silicon-containing adhesion promoter is one or more of a polysiloxane (see, e.g., U.S. Pat. No. 5,502,045 at column 2, lines 8-20 and at column 3, lines 3-54, incorporated herein by reference); a tetraorthosilicate (see, e.g., U.S. Pat. No. 6,306,924 at column 2, lines 26-39 and column 3, lines 24-42, incorporated herein by reference); or a multifunctional silane (see, e.g., U.S. Pat. No. 6,355,127 at column 21, lines 44 to column 22, line 38, incorporated herein by reference) or adhesion promoters that are reaction products of these silanes and other intermediates. Mixtures of any of these are possible as well.

Non-limiting examples of silane coupling agents include: vinyltriacetoxysilane, vinyltrimethoxysilane, vinyltriethoxysilane, vinyltri(2-methoxyethoxy) silane, vinyltriphenoxysilane, vinyltriisopropoxysilane, vinyltri-t-butoxysilane, divinyldiethoxysilane, γ-glycidoxypropyltrimethoxysilane, allyltriethoxysilane, allyltrimethoxysilane, (3-acryloxypropyl)dimethylmethoxysilane, (3-acryloxypropyl)-methyldimethoxysilane, (3-acryloxypropyl)trimethoxysilane, (methacryloxy-methyl)dimethylethoxysilane, methacryloxymethyltriethoxysilane, methacryl-oxymethyltrimethoxysilane, methacryloxypropyldimethylethoxysilane, methacryl-oxypropyltrimethoxysilane, styrlethyltrimethoxysilane, mercaptomethyl-methyldiethoxysilane, 3-mercaptopropylmethyldimethoxysilane, 3-mercaptopropyl-triethoxysilane, 3-mercaptopropyltrimethoxysilane, and amino silanes, such as aminopropyltrimethoxysilane, bis(3-trialkoxysilylpropyl) amine, bis(trimethoxysilyl)propyl amine, (bis(3-trimethoxysilylpropyl) amine), or bis(triethoxysilyl)propyl amine; at least partial hydrolysates thereof or mixtures thereof. One preferred bis(3-trialkoxysilylpropyl) amine is commercially available under the name of SILQUEST A-1170 from GE Silicones, DYNASYLAN 1122 from Degussa or Z-6016 from Dow Corning. Once the adhesion promoter ingredient has been added, the formulation is mixed once again to form the coating composition.

In a preferred embodiment, the composition comprises either one or both of at least two silane adhesion promoters, one selected from the group of polysiloxanes and tetraorthosilicates and a second selected from a group of multifunctional silanes.

Preferred tetraalkylorthosilicates are described by the following formula:

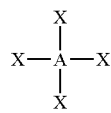

where A is Si, and where X (which may be the same or different each occurrence) is separately in each occurrence hydrolyzable groups that can be hydrolyzed from the tetrasubstituted compound in the presence of water. Examples of hydrolyzable groups include, but are not limited to, halogen (e.g., chlorine, fluorine and bromine), formyloxy, acetoxy, propionyloxy, valeryloxy, stearoyloxy, benzoyloxy, naphthoyloxy, toluoyloxy, maleoyloxy, alkoxy, alkylthio, vinyloxy, allyloxy, vinyletheroxy, methacryloxy and acryloxy. These and other groups herein are defined according to the IUPAC Nomenclature Rules (1969). Preferably, the hydrolyzable groups X are independently an alkoxy group or a group containing ethylenic unsaturation. Preferably, the alkoxy group is a $C_1$-$C_6$ alkoxy, such as a methoxy, ethoxy, isopropoxy, n-butoxy, sec-butoxy, isobutoxy or tert-butoxy. Examples of hydrolyzable groups containing ethylenic unsaturation include, but are not limited to, vinyloxy, allyloxy, vinyletheroxy, methacryloxy and acryloxy. Preferably, the tetrasubstituted compound is a liquid, though it may be a solid soluble in the matrix composition. Tetramethoxy silane and tetraethoxy silane may be purchased as tetramethyl orthosilicate and tetraethyl orthosilicate respectively, from the Aldrich Chemical Company of Milwaukee, Wis. or from Silbond Corporation under the trademark SILBOND.

One polysiloxane useful herein is illustrated by the formula:

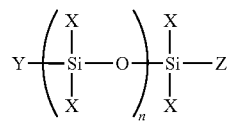

wherein Y and Z are independently selected from the group consisting of halogen, amino, alkyl and alkoxy; n is one or more; and each X is as defined hereinbefore. As used herein the term "alkyl" shall mean a monovalent straight chain or branched chain group of carbon atoms including, but not limited to, methyl, ethyl, n-propyl, isopropyl, n-butyl, sec-butyl, isobutyl, tertbutyl and the like. As used herein the term "alkoxy" shall mean an alkyl group attached to the remainder of the molecule through an oxygen atom including, but not limited to, methoxy, ethoxy, isopropoxy, n-butoxy, sec-butoxy, isobutoxy, tert-butoxy and the like. Preferably, the alkyl portions of the alkoxy groups are lower alkyl groups, i.e., an alkyl group, branched or unbranched, cyclic or acyclic, having from 1 to 10 carbon atoms inclusive. Examples of lower alkyl groups include, but are not limited to, methyl, ethyl, propyl, isopropyl, butyl, pentyl and cyclohexyl. Most preferably, each alkyl group is methyl or ethyl. As used herein the term "lower alkoxy group" shall mean an alkyl group attached to the remainder of the molecule through an oxygen atom, where the alkyl group is a lower alkyl group. The siloxane main chain may be linear or branched, such that some Xs are alkoxy groups and some Xs are siloxane groups. Each alkoxy group may be the same or different. Preferably, the poly(siloxane) is a liquid, though it may be a solid soluble in the matrix composition.

Multifunctional silanes comprise compounds which have a silane functionality and a second functional group including epoxy, amino, vinyl, isocyanate, isocyanurate, mercapto, acrylate, methacrylate groups and the like. Preferred adhesion promoters for adhesion to coated surfaces, such as those coated with a clear coat or a pigmented coating, include the (meth)acrylate alkoxy silanes, amino alkoxy silanes, vinyl alkoxy silanes, isocyanato alkoxy silanes, epoxyalkoxy silanes, mercapto alkoxy silanes and isocyanurate functional alkoxy silanes for instance. More preferred multifunctional silanes include gamma-glycidoxy-propyltrimethoxy silane, gamma-aminopropyltrimethoxy silane, gamma-isocyanatopropyltrimethoxy silane, n-beta-(aminoethyl)gamma-aminopropyl-trimethoxy silane, n-(2-aminoethyl)-3-aminopropyl-methyldimethoxy silane, 3-aminopropylmethyl-dimethoxy silane, 3-aminopropylmethyldimethoxy silane, bis-(gamma-trimethoxysilyl-propylamine), bis(triethoxysilyl)propyl amine, n-phenyl-gamma-aminopropyl-trimethoxysilane, gamma-isocyanatopropyl-methyldimethoxy silane, gamma-isocyanatopropyltriethoxy silane, beta (3,4-epoxy-cyclohexyl)ethyl-triethoxysilane, gamma-glycidoxypropylmethyldimethoxy silane, tris(gamma-trimethoxysilylpropyl) isocyanurate, 3-acryloxypropyltrimethoxysilane, 3-methacryloxypropyltrimethoxysilane, vinyltriethoxysilane, or vinyltrimethoxysilane.

In another preferred embodiment, the adhesion promoter is a Michael addition product of siloxane further containing one or more active hydrogen containing functional moieties with two or more acrylate groups. The reaction product preferably has four or greater siloxy groups and more preferably 6 or greater. The reaction product preferably contains no active hydrogen atoms. The reaction products also preferably have at least one unsaturated group capable of reacting in the presence of free radicals. Preferably, the acrylate containing reactant is an alkoxylated polyol derived di or polyacrylate such as propoxylated neopentyl glycol diacrylate, propoxylated glyceryl triacrylate, or other polyacrylates such as hexanediol diacrylate, tripropylene glycol diacrylate, dipropylene glycol diacrylate, cyclohexanedimethanol diacrylate, alkoxylated cyclohexanedimethanol diacrylates, nonanediol diacrylate, tricyclodecane dimethanol diacrylate, cis/trans 1,3/1,4 cyclohexanedimethanol diacrylate, butanediol diacrylate, butylene glycol diacrylate, ditrimethylolpropane tetraacrylate, and the like. The Michael addition product is prepared by reacting the reactants at elevated temperatures of about 30° C. to about 60° C., preferably about 55° C. for a sufficient time such that all of the functional groups having active hydrogen atoms are reacted for instance, all amines are tertiary amines. Preferably, the reactants are reacted at elevated temperatures for greater than about 72 hours. It will be appreciated that one or more additives (e.g., a catalyst may be employed to accelerate the reaction time. For example, without limitation, a tertiary amine (e.g., in an amount of about 0.1 to about 3 parts by weight) may be employed in an instance when the composition uses a Michael addition product, such as 1,8 diazobicyclo[5.4.0]undec-7-Ene, (available from Aldrich under the designation DBU).

In another embodiment, the adhesion promoter is a high molecular weight adduct having multiple alkoxysilane moieties. Preferably, the adduct has 3 or greater alkoxysilane moieties and more preferably 6 or greater. Preferably, the adduct has a number average molecular weight of about 500 Da or greater and more preferably 1,000 Da or greater. The adduct preferably contains no reactive hydrogen containing moieties. In a preferred embodiment, the adduct is the reaction product of an epoxy silane, such as gamma propyl trimethoxy epoxy silane or gamma propyl triethoxy epoxy silane, with one or more silanes having reactive hydrogen containing moieties under conditions that an excess of epoxy equivalents is present as compared to active hydrogen containing moieties. Preferably, the equivalent ratio of epoxy moieties to active hydrogen containing moieties is about 1.1 or greater; and more preferably about 1.12. Preferably, the equivalent ratio of epoxy equivalents to active hydrogen containing moieties is about 1.14 or less. The preferred active hydrogen containing moieties are amine and mercapto with amine being most preferred. The epoxy silane active hydrogen containing silane reacted product is thereafter reacted with the reaction product of an aliphatic di- or polyisocyanate, such as tetramethylene diisocyanate (TMDI), and an active hydrogen functional moiety containing silane, for instance, an aminosilane or mercaptosilane. The two reaction products are reacted in a sufficient ratio such that the resulting adduct contains no active hydrogen atoms or isocyanate groups. The resulting adduct is added to the compositions in a sufficient amount to enhance the long term adhesion of the coating composition to substrates and adhesive systems. Preferably, the high molecular weight alkoxysilane containing adduct is present in an amount of about 1 part by weight or greater and more preferably about 5 parts by weight or greater of the matrix. The high molecular weight alkoxysilane containing adduct is preferably present in an amount of about 15 parts by weight or less and more preferably about 10 parts by weight or less of the matrix. The high molecular weight alkoxysilane adduct is preferably added to the coating composition of the invention in admixture with a reactive diluent as described hereinbefore. In a preferred embodiment, the adhesion promoter comprises a mixture of the Michael addition product containing alkoxysilane groups and the high molecular weight alkoxysilane adducts, preferably the two types of adducts are used in a ratio of about 1 to about 15 and more preferably about 1 to about 5.

When present, any adhesion promoters are preferably present in an amount of about 1, more preferably about 6, most preferably about 8, and still more preferably about 10 parts by weight or greater of the matrix. Preferably, the adhesion promoter is present in an amount of about 30 and more preferably about 20 parts by weight or less of the matrix.

The matrix composition further typically comprises a compound reactive with the film-forming resin and containing an acidic moiety. Preferably, the acid group is a strong acid group; such strong acids include carboxylic acids, phosphoric acids, sulfuric acids and sulfonic acid groups. Mercapto or other sulfur-containing acids may be employed. Preferred acid groups are carboxylic acid groups and phosphoric acid groups, such as phosphate acids. The most preferred acid groups are carboxylic acid groups. Moreover, it is preferred that the acid contains unsaturation (such as a double bond from an acrylate, methacrylate, vinyl, or allyl group) so that it can co-react with the other acrylate present in the coating. Among preferred classes of acid-containing compounds are acidic functional acrylates or (meth)acrylates, including methacrylic acids, acrylic acids, acrylated phosphate acid esters, mono-2-(methacryloxy)ethyl maleate, mono-2-(methacryloyloxy)ethyl maleate, or phosphoric monoacrylate, maleic acids, itaconic acids, vinyl phosphonic acid, 2-sulfoethylmethacrylate, beta-carboxyethyl acrylate, 3-butenoic acid, 4-pentenoic acid, acrylamido glycolic acid, crotonic acid, tiglic acid, 2-(Trifluoromethyl)acrylic acid, dimethylacrylic acid, undecylenic acid, mixtures thereof and the like. The acid is present in a sufficient amount to enhance bonding to the glass or coated plastic and/or adhesive. The reactive acid-containing compound is present in the composition in an amount of about 1 and more preferably about 4 parts by weight or greater based on the matrix composition. The reactive acid compound is preferably present in the composition in an amount of about 20, more preferably about 10, and still more preferably about 8 weight parts or less of the matrix.

In one embodiment the composite composition of the present invention will be substantially free of any added filler. However, the composition optionally may further comprise a filler, such as one or more of silicates, aluminas, zirconias, carbides, or any other fillers with high hardness (Mohs Hardness of greater than about 7), combinations thereof and the like. More preferred aluminas useful in the invention are alpha aluminas. Preferably, the fillers have a particle size of about 10 microns or less and most preferably 5 microns or less. When employed, filler is present in a sufficient amount to enhance the surface hardness and abrasion resistance and in an amount such that a homogeneous dispersion can be prepared. Thus it may be present in as little as about 5 parts by weight, to about 60 parts by weight of the matrix, or as otherwise disclosed in co-pending application Ser. No. 11/472,119 filed Jun. 20, 2006 (priority to 60/692,318 filed Jun. 20, 2005), by Baikerikar et al. (incorporated by reference).

The composition may further comprise a catalyst or initiator capable of initiating cure of the film-forming resin under curing conditions. Preferably, those curing conditions are sufficient to cause formation of free radicals or cations. Preferred catalysts or initiators include photoinitiators which initiate free radical polymerization by the formation of free radicals or which generate cations, or thermal initiators which generate free radicals or which form or release cations when exposed to heat. Photoinitiator systems having a corresponding sensitivity to actinic radiation are normally incorporated into formulations containing compounds of the present invention and upon irradiation lead to the formation of reactive species capable of initiating polymerization. In one preferred embodiment, the initiator is a compound which when exposed to irradiation initiates free radical polymerization. Examples of photoinitiators include alpha aminoketones, alpha hydroxyketones, phosphine oxides, phenylglyoxalates, thioxanthones, benzophenones, benzoin ethers, oxime esters, amine synergists, maleimides, mixtures thereof and the like. Preferable photoinitiators include compounds in the following categories: phosphine oxides, ketones and their derivatives, benzophenones, carbocyanines and methines, polycyclic aromatic hydrocarbons, such as anthracene or the like, and dyestuffs, such as xanthenes, safranines and acridines. More generally, these are essentially chemical substances belonging to one of the following major categories: compounds containing carbonyl groups, such as pentanedione, benzil, piperonal, benzoin and its halogenated derivatives, benzoin ethers, anthraquinone and its derivatives, p,p'-dimethylaminobenzophene, benzophenone and the like; compounds containing sulfur or selenium, such as the di- and polysulfides, xanthogenates, mercaptans, dithiocarbamates, thioketones, beta-napthoselenazolines; peroxides; compounds containing nitrogen, such as azonitriles, diazo compounds, diazides, acridine derivatives, phenazine, quinoxaline, quinazoline and oxime esters, for example, 1-phenyl-1, 2-propanedione 2-[0-(benzoyl)oxime]; halogenated compounds, such as halogenated ketones or aldehydes, methylaryl halides, sulfonyl halides or dihalides; phosphine oxides and photoinitiator dyestuffs, such as diazonium salts, azoxybenzenes and derivatives, rhodamines, eosines, fluoresceines, acriflavine or the like. Common photoinitiators include 2,2-diethoxyacetophenone, dimethoxyphenylacetophenone, phenyl benzoin, benzophenone, substituted benzophenones, phosphine oxides and the like. It is understood by those skilled in the art that when benzophenone and similar compounds are used as photoinitiators a synergistic agent, such as a tertiary amine or polymeric amine such as a secondary or primary amine terminated poly(propylene oxide) polyol are employed to enhance the conversion of photoadsorbed energy to polymerization-initiating free radicals.

The photoinitiators supply to the molecules containing unsaturation or to the initiator part of the energy transmitted by the light. By means of the unsaturated systems or of a photoinitiator, the photosensitizers produce free radicals or ions, which initiate the polymerization or the cross-linking of the composition. It is also possible to use mixtures with known photoinitiators for example, mixtures with camphorquinone; benzophenone; benzophenone derivatives (e.g. 1-[4-(4-benzoyl-phenylsulfanyl)-phenyl]-2-methyl-2-(toluene-4-sulfonyl)-propan-1-one); acetophenone, acetophenone derivatives, for example, α-hydroxycycloalkyl phenyl ketones or dialkoxyacetophenones; α-hydroxy- or α-amino-acetophenones, for example, oligo-[2-hydroxy-2-methyl-1-[4-(1-methylvinyl)-phenyl]-propanone], 2-hydroxy-2-methyl-1-phenyl-propanone, 2-hydroxy-1-[4-(2-hydroxy-ethoxy)-phenyl]-2-methyl-propan-1-one, 2-methyl-1-[4-(methylthio)phenyl]-2-(4-morpholinyl)-propan-1-one, 2-dimethylamino-2-(4-methylbenzyl)-1-(4-morpholin-4-yl-phenyl)-butan-1-one, 2-benzyl-2-dimethylamino-1-(3,4-dimethoxy-phenyl)-butan-1-one, 2-benzyl-2-dimethyl-lamino-1-(4-morpholin-4-yl-phenyl)-butan-1-one, 2-methyl-1-(4-methylsulfanyl-phenyl)-2-morpholin-4-yl-propan-1-one; 4-aroyl-1,3-dioxolanes; benzoin alkyl ethers and benzil ketals, for example, benzil dimethyl ketal, phenyl glyoxalates and derivatives thereof, for example, methylbenzoyl formate; dimeric phenyl glyoxalates, for example, oxo-phenyl-acetic acid 2-[2-(2-oxo-2-phenyl-acetoxy)-ethoxy]-ethyl ester; peresters, for example, benzophenone-tetracarboxylic acid peresters, as described, for example, in EP 126 541 (U.S. Pat. No. 4,777,191 and U.S. Pat. No. 4,970,244 incorporated herein by reference); monoacylphosphine oxides, for example, (2,4,6-trimethylbenzoyl)-diphenyl-phosphine oxide or phenyl-(2,4,6-trimethylbenzoyl)-phosphinic acid ethyl ester, bisacylphosphine oxides, for example, bis(2,6-dimethoxybenzoyl)-(2,4,4-trimethyl-pent-1-yl) phosphine oxide, bis(2,4,6-trimethylbenzoyl)-phenyl-phosphine oxide or bis(2,4,6-trimethylbenzoyl)-(2,4-dipentox-yphenyl)phosphine oxide, trisacylphosphine oxides; halomethyltriazines, for example, 2-[2-(4-methoxy-phenyl)-vinyl]-4,6-bis-trichloromethyl-[1,3,5]triazine, 2-(4-methoxy-phenyl)-4,6-bis-trichloromethyl-[1,3,5]triazine, 2-(3,4-dimethoxy-phenyl)-4,6-bis-trichloromethyl-[1,3,5]triazine, 2-methyl-4,6-bis-trichloromethyl-[1,3,5]triazine; hexaaryl-bisimidazole/coinitiator systems, for example, ortho-chlorohexaphenyl-bisimidazole together with 2-mercaptobenzthiazole; ferrocenium compounds or titanocenes, for example, dicyclopentadienyl bis(2,6-difluoro-3-pyrrolo-phenyl)titanium; borate photoinitiators or O-acyloxime photoinitiators as described, for example, in GB 2,339,571 (U.S. Pat. No. 6,596,445 incorporated herein by reference).

It is also possible to add thermal free radical initiators, for example, benzoyl peroxide (other suitable peroxides are described in U.S. Pat. No. 4,950,581, column 19, lines 17-25), incorporated herein by reference or cationic initiators, such as aromatic sulfonium, phosphonium or iodonium salts, as described, for example, in U.S. Pat. No. 4,950,581, column 18, line 60 to column 19, line 10 incorporated herein by reference. An example of an iodonium salt is (4-isobutyl-phenyl)-4-methylphenyl-iodonium hexafluorophosphate. Maleimide derivatives, as described, for example, in U.S. Pat. No. 6,153,662 or U.S. Pat. No. 6,150,431 both incorporated herein by reference, may also be present. Examples which may be mentioned are N-(2-trifluoromethyl-phenyl)maleimide and N-(2-tert-butylphenyl)maleimide.

Among preferred classes of photoinitiators are alpha aminoketones, phosphine oxides, alpha hydroxyketones, benzophenones, mixtures thereof and the like. Among preferred photoinitiators are 1-hydroxycyclohexyl-phenylketone available from Ciba Geigy under IRGACURE 184, oligomeric alpha hydroxyketones, such as ESACURE ONE or KIP 150 from Lamberti, 2-benzyl 2-N-dimethylamino-1-(4-mor-pholinophenyl)-1-butanone available from Ciba Geigy under IRGACURE 369 or IRGACURE 379, and phosphine oxides available from BASF under LUCIRIN TPO, LUCIRIN TPO-L, LUCIRIN TPO-XL, or IRGACURE 819, IRGACURE 2100 from Ciba, mixtures thereof, such as SARCUR™ SR 1135 from Sartomer or ESACURE KTO 46 or TZT from Lamberti, which is a mixture of an alpha hydroxy ketone benzophenone derivatives and a phosphine oxide, and the like. Preferably, the catalyst or initiator is present in an amount of about 0.1, more preferably about 1, even more preferably about 2 and most preferably about 4 parts by weight or greater based on the weight of the matrix composition. Preferably, the catalyst or initiator may be present in an amount of about 20, more preferably about 12, even more preferably about 10, and most preferably about 8 parts by weight or less based on the weight of the matrix composition.

In one specific aspect of the invention the matrix compositions of the invention cure by two mechanisms. First, they cure as a result of free radical polymerization of the unsaturated moieties or cationic polymerization. Further, they cure by silanol condensation. The silanol condensation proceeds upon exposure to atmospheric moisture. Silanol condensation is catalyzed by acid, base or organic metallic catalysts, as described in U.S. application Ser. No. 11/472,119 filed Jun. 20, 2006 (priority to 60/692,318 filed Jun. 20, 2005), by Baikerikar et al. (incorporated by reference). The compositions of the invention generally will contain acidic containing compounds and may contain amines which catalyze the reaction. Alternatively, a suitable moisture cure catalyst may be added.

The matrix composition may further include one or more other ingredients, such as are disclosed in U.S. application Ser. No. 11/472,119 filed Jun. 20, 2006 (priority to 60/692,318 filed Jun. 20, 2005), by Baikerikar et al. (incorporated by reference) For example, among the additional optional ingredients that may be included in the matrix composition are pigments, dyes, a dispersant or surfactant which stabilizes the dispersion of solid particles in the liquid medium and facilitates formation of a continuous void-free film, a surface active agent present to improve substrate wetting and the appearance of the coating, a defoamer and/or deaerator which prevents foaming or the formation of bubbles and which does not negatively impact the adhesive properties of the composition may be used, a polymerization inhibitor for preventing polymerization prior to exposure to curing conditions, compounds or polymers which improve the water resistance and/or adhesion of the composition to the substrate, colloidal silica acrylates for the purpose of improving hardness and abrasion resistance, a flexibilizer or rubber toughener can also be used to improve the flexibility and adhesion of the compositions, or any combination thereof.

It is contemplated that the composites herein are substantially free of any added pigment or dye. If added, however, pigments or dyes useful in the invention may be organic or inorganic. Preferable inorganic pigments include black iron oxides, zinc oxide, cerium oxide, indium tin oxide, antimony-doped tin oxide, and titania ($TiO_2$), while preferable organic pigments include carbon black, phthalocyanines, anthraquinones, perylenes, carbazoles, monoazo- and disazobenzimidazolones, isoindolinones, monoazonaphthols, diarylidepyrazolones, rhodamines, indigoids, quinacridones, diazopyranthrones, dinitranilines, pyrazolones, dianisidines, pyranthrones, tetrachloroisoindolinones, dioxazines, monoazoacrylides, anthrapyrimidines and mixtures thereof. Carbon black pigment is commercially available under the name of MOGUL from Cabot. A list of commercial pigments which are useful in the compositions of the invention are disclosed in U.S. Patent Application 2002/0086914 relevant portions incorporated herein by reference. For example, such pigments may include carbon black, black iron oxides, black IR-reflective pigments such as chromium green-black hematite, the like, or otherwise. If employed, the pigment or dye may be present in any suitable amount from about 1 to about 15 parts by weight of the matrix (e.g., about 1, 2, 3, 5, 8, 12 or even 15 parts by weight).

If employed, examples of dispersants which may be used according to the invention include the anionic surfactants for example, lignosulfonates, dialkyl sulfosuccinates, sulfated or sulfonated fatty acids or fatty acid esters of fatty acids, reaction products of ethylene oxide and/or propylene oxide with saturated or unsaturated fatty acids, fatty alcohols, fatty amines, alicyclic alcohols or aliphatic-aromatic hydrocarbons which have been esterified in the terminal position by an inorganic oxygen-containing acid or a polybasic carboxylic acid. Useful dispersants include the following non-ionic surfactants: ethylene oxide adducts from the class of the addition products of ethylene oxide with higher fatty acids, saturated or unsaturated fatty alcohols, fatty amines, mercaptans, fatty acid amides, fatty acid alkylol amides or fatty amines or with alkylphenols or with alkylthiophenols, with from 5 to 100 mol of ethylene oxide being used per mole of the mentioned compounds, as well as ethylene oxide-propylene oxide block polymers and ethylene-diamine-ethylene oxide-propylene oxide adducts. These include: reaction products of saturated and/or unsaturated fatty alcohols having from 8 to 20 carbon atoms with from 20 to 100 mol of ethylene oxide per mol of alcohol, preferably saturated linear $C_{16}$-$C_{18}$ alcohols with from 25 to 80 mol, especially 25 mol, of ethylene oxide per mol of alcohol; reaction products of saturated and/or unsaturated fatty acids having from 8 to 20 carbon atoms with from 5 to 20 mol of ethylene oxide per mol of acid; reaction products of alkylphenols having from 7 to 12 carbon atoms with from 5 to 25 mol of ethylene oxide per mol of phenolic hydroxy group, preferably mono- or dialkylphenols with from 10 to 20 mol of ethylene oxide per mol of phenolic hydroxyl group; reaction products of saturated and/or unsaturated fatty acid amides having up to 20 carbon atoms with from 5 to 20 mol of ethylene oxide per mol of acid amide, preferably oleic acid amides with from 8 to 15 mol of ethylene oxide per mol of acid amide; reaction products of saturated and/or unsaturated fatty amines having from 8 to 20 carbon atoms with from 5 to 20 mol of ethylene oxide per mol of amine, preferably oleylamines with from 8 to 15 mol of ethylene oxide per mol of amine; ethylene oxide-propylene oxide block polymers having from 10 to 80 percent ethylene oxide and molecular weights from 1,000 to 80,000; ethylene oxide-propylene oxide adducts with ethylenediamine. Another useful class of dispersants are polymeric dispersants and protective colloids, including amphiphilic copolymers, block copolymers or graft or comb polymers, especially those based on acrylic acid, methacrylic acid or salts thereof, hydroxyalkyl(meth) acrylic acid, aminoalkyl(meth)acrylic acid or salts thereof, 2-acrylamido-2-methylpropanesulfonic acid (AMPS) or salts thereof, maleic anhydride or salts thereof, (meth)acrylamide or substituted (meth)acrylamides, vinyl heterocycles, for example vinylpyrrolidone, vinylimidazole, as well as amphiphilic polymers containing segments of (polyethylene oxide) PEO or EO/PO (ethylene oxide/propylene oxide) copolymers. Examples of suitable protective colloids are polyvinyl alcohol, polyvinylpyrrolidone or its copolymers. Also suitable are copolymers of synthetic monomers, especially of monomers having carboxyl groups, for example copolymers of 2-vinylpyrrolidone with 3-vinylpropionic acid or maleic acid copolymers and salts thereof.

Most preferred dispersants and surfactants include polymeric amide hyperdispersants available from Noveon under the trademark SOLSPERSE 32000 and 39000 and polypropylene oxide based ammonium salts, such as diethylpolypropoxy methyl ammonium chloride available from Degussa under the trademark and designation VARIQUAT CC-59 and diethyl polypropoxy 2-hydroxy ammonium phosphate available from Degussa under the trademark and designation VARIQUAT CC-42NS, and phosphate acid esters such as RHODAFAC RS-610 and RE 610 available from Rhodia, or unsaturated phosphate esters such as MAXEMUL 6106 and 6112 from Uniqema, and the like. Specific surfactant based dispersants are commercially available under the name of Disperbyk 2000 or Disperbyk 2001 from BYK-Chemie and particle based dispersants such as a modified silica, are commercially available under the name of AEROSIL R7200 from Degussa.

If employed, the dispersants may be used in any suitable amount, consistent with the teachings in U.S. application Ser. No. 11/472,119 filed Jun. 20, 2006 (priority to 60/692,318 filed Jun. 20, 2005), by Baikerikar et al. (incorporated by reference). For example, any dispersants and/or surfactants may be employed in an amount of about 0.5 parts by weight or greater based on the weight of the composition, and most preferably about 1.0 parts by weight or greater. The dispersant and/or surfactant are preferably used in an amount of about 10 parts by weight or less, and most preferably about 5 parts by weight or less based on the weight of the matrix composition.

If employed, for surface active agents for improving substrate wetting and the appearance of the coating, any surface active agent which is useful in improving the substrate wetting and appearance of the coating may be used. Examples include surface active agents having limited influence on intercoat adhesion, such as polydimethyl siloxanes with low silicone content, silicone acrylates, silicone-free wetting agents/surfactants, mixtures thereof and the like. More preferred surface active agents include polyether modified polydimethylsiloxanes with low silicone content, silicone acrylates, siloxanes with various organic functional groups (such as carboxylic acid, amine, hydroxyl, acrylate, methacrylate, vinyl, epoxy, isocyanate, phosphonic acid, etc.) and silicone-free wetting agents which do not affect intercoat adhesion, mixtures thereof and the like. One specific surface active agent includes one or more silicone acrylates, such as available from Tego Chemie (Degussa) under the trademark and designation TEGO RAD 2100, 2200N, 2250 and 2300 or the BYK UV 3500 series (3500, 3510, 3530, 3570) available from BYK Chemie, or siloxanes with various organic functional groups available under the SILMER series from Siltech Corporation, or one or more polyacrylates, such as Modaflow from UCB.

The surface active agents are present in the composition in a sufficient amount to improve the surface appearance of the coating, substrate wetting and leveling. Preferably, the surface active agents are present in an amount of about 0.05 parts by weight or greater, even more preferably about 0.1 parts by weight or greater and most preferably about 0.2 parts by weight or greater based on the weight of the composition. The surface active agent is preferably present in an amount of about 4 parts by weight or less, more preferably 2 part by weight or less, and still more preferably about 1 part by weight or less based on the weight of the matrix composition.

Any defoamer and/or deaerator which prevents foaming or the formation of bubbles and which does not negatively impact the adhesive properties of the composition may be used. Preferable defoamers are silicone defoamers, silicone free defoamers, polyacrylate defoamers, mixtures thereof and the like. More preferred defoamers include FOAM BLAST™ 20F, FOAM BLAST™ 30 and FOAM BLAST™550 polyacrylate defoamers available from Lubrizol; TEGO AIREX™ 920 polyacrylate defoamer and TEGO AIREX™ 980 from Degussa, SILMER ACR Di-10 and ACR Mo-8 polydimethylsiloxane acrylate copolymer from Siltech Corporation, or FOAMEX N™ silicone based defoamers available from Degussa or BYK 1790 silicone-free defoamer from BYK Chemie. The defoamer/deaerator is present in the compositions of the invention in a sufficient amount to prevent formation of bubbles and/or foam, e.g., in an amount of about 0.05 parts by weight or greater based on the weight of the matrix composition, and more preferably about 0.1 part by weight or greater. It is also possible to employ the defoamer/deaerator in an amount of about 1.0 part by weight or less based on the weight of the composition.

Any polymerization inhibitor which prevents polymerization of the functional groups contained in the composition may be used. Where the functional groups polymerize when exposed to free radicals, hydroquinones, phenothiazines (most preferable), mixtures thereof or the like may be used. Specific examples of polymerization inhibitors include 4-methoxyphenol (MEHQ), hydroquinone (HQ), 2,6-Di-tert-butyl-4-methylphenol, i.e. butylated hydroxytoluene (BHT), phenothiazine, 2,2,6,6-Tetramethyl-4-hydroxypiperidine-1-oxyl, such as XENOXYL available from Avecia, 2,2,6,6-tetramethylpiperidinyl-1-oxide (TEMPO), IRGASTAB UV 10 from Ciba, ADDITIVE™ 01-468 or GENORAD™ 16 available from Rahn. Preferably, the polymerization in an amount of about 0.01 weight parts or greater, more preferably about 0.05 weight parts or greater, and most preferably about 0.1 weight parts or greater based on the weight of the matrix composition. Preferably, the polymerization inhibitor is present in an amount of about 2 and more preferably about 1 parts or less based on the weight of the matrix composition.

Among compounds for improving water resistance and/or adhesion of the composition to the substrate are fluorinated additives, (fluoro silanes), polybutadiene acrylates, silyated polymers (such as the reaction products of isocyanatosilanes and hydroxy functional acrylates or aminosilanes and multi-functional acrylates), titanate, zirconate, or zirco-aluminate, (also discussed herein as adhesion promoters), and/or silane-treated fillers. Fluoro-silanes are commercially available under the name of DYNASYLAN F8261 or F8263 from Degussa, Z-6704 from Dow Corning, FTONE from Daikin, and fluorinated acrylates are commercially available under the name of ZONYL from Dupont, and POLYFOX from Omnova. Polybutadiene acrylate is commercially available under the name of CN 301, CN 302, CN 303, CN 307, or RICACRYL 3801 from Sartomer and BAC-15 or BAC-45 from Kowa. Other commercial examples of titanate, zirconate, or zirco-aluminate adhesion promoters are available under the trade name of KR from Kenwich or from Chartwell International. Silane treated fillers are commercially available from Baikowski-Malakoff, Quarzwerke, or Admafine.

To improve weatherability, the following components may be added: hindered amine light stabilizers, such as TINUVIN™ 123, 152, 292, or 5100 from Ciba Geigy or SANDUVOR™ TB-02 or 3058 from Clariant, ultraviolet absorbers or stabilizers such as TINUVIN™ 400, 479, R600, R796 or 1130 available from Ciba Geigy, SANDUVOR™ PR-31 available from Clariant or HOMBITEC™ RM 300 available from Sachtleben. The compositions may further include antioxidants, such as IRGANOX™ 1035 or 1076 from Ciba Geigy or ETHANOX™ 376 and ETHAFOS™ 368 from Albemarle. The compositions also may include moisture scavengers to improve the hydrolytic stability of the composition. Any moisture scavenger known in the art which does not interfere with the functioning of the composition may be used. Among preferred moisture scavengers are vinyltrimethoxysilane, oligomeric vinyltrimethoxysilane (such as DYNASYLAN 6490 from Degussa) triethylortho-formate, triethylorthoacetate and molecular sieve powders such as SYLOSIV™ from Grace Davison.

Among preferred colloidal silica acrylates are silica nanoparticle dispersions in acrylates such as isobornyl acrylate, hexane diol diacrylate, tripropylene glycol diacrylate propoxylated neopentyl glycol diacrylate, propoxylated glyceryl triacrylate, or acrylate oligomers. Such dispersions are available from Clariant under HIGHLINK NANO and from Hanse-Chemie under NANOCRYL. Colloidal alumina nanoparticle dispersions in acrylate monomers, such as NANODUR from Nanophase Technologies, or NANOBYK from BYK-Chemie could also be used. In addition, polyethylene, polytetrafluoroethylene or polypropylene wax dispersions in acrylate monomers, such as the EVERGLIDE or S-390 or SST series of products from Shamrock Technologies, or polyamide particles such as ORGASOL from Arkema, or montan wax with reactive acrylate groups, such as Ceridust TP 5091 from Clariant could be used to further improve scratch resistance and scuff/rub resistance. Alternatively, the wax can be added in powder form. The wax dispersions are preferably present in an amount of about 0.5 parts by weight or greater and preferably about 1 or greater. The wax dispersion is present in an amount of about 10 parts by weight or less, preferably 5 parts by weight or less of the matrix.

Examples of flexibilizers are thermoplastic acrylic bead resins such as ELVACITE™ thermoplastic acrylic bead resins from Lucite (Ineos Resins) or HYCAR liquid butadiene resins from Noveon.

The matrix composition preferably has a viscosity which allows it to be processed with the conductive material for application to a substrate. The specific viscosity that may be used will be dictated by the application method. For instance, formulations for screen printing will require much higher viscosity than formulations used for ink jet printing. For example, if the composition is applied by screen printing the conductive composite composition typically has a viscosity of about 2,000 centipoises or greater and more preferably about 5,000. Preferably, the conductive composite composition has a viscosity of 50,000 centipoise or less. If the conductive composite composition is applied by ink jet printing, the composition has a viscosity of 5 centipoises or greater. Preferably, the conductive composite composition has a viscosity of 50 centipoises or less. If the conductive composite composition is applied by spraying it onto the substrate, the composition has a viscosity of 5 centipoises or greater. Preferably, the conductive composite composition has a viscosity of 100 centipoises or less.

The composite of the invention may be prepared by contacting the ingredients and blending, using art-disclosed techniques. In one preferred approach, the materials are contacted under conditions such that a stable homogeneous dispersion is prepared. The materials may be contacted at about ambient temperature (about 20-25° C.) to about 60° C. and preferably at ambient temperature. The components may be blended in air and preferably blended in a dry environment to improve the hydrolytic stability of the composition. Preferably, the materials are blended for about 60 minutes or greater, more preferably about 90 minutes or greater. Preferably, the materials are blended for a period of about 240 minutes or less and more preferably about 180 minutes or less. The composite material optionally may be subjected to a grinding step. This grinding may occur in any equipment known to those skilled in the art for performing such grinding (i.e. ball milling, horizontal or vertical media milling, sand or pebble milling, etc). Preferably, the composition is stored in a dry environment.

The composite may be applied to a substrate (e.g., glass or coated plastic) in any art-disclosed means, such as using a brush, roller, sprayed onto the surface, ink jet printing, screen printing and the like. It may be applied using art-disclosed robotic application devices (e.g., one having at least 2 axes of motion). After application of the composite to the surface of the substrate, it is exposed to polymerization conditions, such as one or more operations which causes the catalyst or initiator to initiate the formation of free radicals and free radical polymerization. In a preferred embodiment, the catalyst or initiator is a photoinitiator and polymerization is initiated by exposing the composition to irradiation, such as ultraviolet light or electronic beam. The energy source used for achieving crosslinking of the radiation functionality may be actinic (e.g., the radiation having a wavelength in the ultraviolet or visible region of the spectrum), accelerated particles (e.g., electron beam radiation), thermal (e.g., heat or infrared radiation), or the like. Preferably, the energy source is actinic radiation or accelerated particles, because such energy source provides excellent control over the initiation and rate of crosslinking. Additionally, actinic radiation and accelerated particles can be used for curing at relatively low temperatures. Suitable sources of actinic radiation include mercury lamps, electrodeless lamps, xenon lamps, carbon arc lamps, tungsten filament lamps, lasers, electron beam energy, sunlight, and the like. Ultraviolet radiation, especially from xenon lamps, medium pressure mercury lamps or electrodeless lamps is most preferred.

Furthermore, it is contemplated that in addition to the conductive composite, the present invention may optionally include a frit (e.g., ceramic frit). As such, the conductive composite may be utilized in place of the frit or in combination therewith. For example, the conductive composite, the frit, or a combination thereof may be capable of blocking transmission of light to prevent it from contacting the adhesive, which bonds the window into a structure. Such coating, frit, or both on the periphery may be also capable of hiding trim components disposed about the periphery of the window.

In a specific embodiment, the invention is glass or abrasion resistant coated plastic having a cured conductive composite of the invention deposited on the surface. The glass or plastic can be flat or shaped, e.g., for defining a curved surface. One aspect of the present invention contemplates applying the conductive composite to a substrate and thereafter shaping the substrate. Optionally, or as an alternative, applying the conductive composite onto a substrate that has been shaped prior to the application of the conductive composite coating. Glass or coated plastic with a coating of the invention can be used for any use for which glass or coated plastic is known to be used by one skilled in the art. Preferably, the glass or coated plastic is used as a window and the coating is found on the periphery of the window. In one aspect the composite herein is applied about the periphery of the window such that it is capable of blocking transmission of light to prevent it from contacting the adhesive, which bonds the window into a structure. Such coating on the periphery also hides the trim components disposed about the periphery of the window. It is also possible that a conventional ceramic frit is employed on the periphery, or an organic frit of the type disclosed in co-pending U.S. patent application Ser. No. 11/472,119 filed Jun. 20, 2006 (priority to 60/692,318 filed Jun. 20, 2005), by Baikerikar et al. (incorporated by reference). Accordingly, for use as a peripheral frit, desirably, any such coating exhibits an ultraviolet light transmission of about 1 percent or less of the light to which the coating is exposed to and more preferably about 0.5 percent or less.

In one preferred embodiment, the substrate herein is glass that is curved, and more preferably, the glass is pre-shaped prior to application of the composites herein. Preferably the cured composite demonstrates an abrasion resistance such that after 500 cycles according to ASTM D1044 test the coating retains a light transmittance of less than 1 percent. Preferably, the coating demonstrates an abrasion resistance of about delta (Δ) percent T<1 percent, more preferably about delta (Δ) percent T<0.75 percent, and most preferably about delta (Δ) percent T<0.5 percent, as determined according to the test ASTM D1044.

The substrates herein are preferably used as a window and more preferably used as a window in an automobile. FIG. 1 illustrates a window according to the invention. FIG. 1 further illustrates a window (10) with a frit (11) located about the periphery of the window (10). In one embodiment, as discussed above, the frit is the same material as the conductive composite. As indicated, in another embodiment the frit is an organic material such as is described in U.S. application Ser. No. 11/472,119 filed Jun. 20, 2006 (priority to 60/692,318 filed Jun. 20, 2005), by Baikerikar et al. (incorporated by reference). Of course, though not as desirable from a standpoint of conventional processing techniques, it may be possible that the peripheral frit includes or consists essentially of a ceramic material. When the frit differs from the conductive composite, the composite may be disposed over, beneath or adjacent to the frit, or any combination thereof.

In another embodiment, the invention is a window made of glass or coated plastic with a cured coating disposed about the periphery of the window and an adhesive applied to the coating. FIG. 2 illustrates one embodiment of this invention, wherein a window (10) has located on it a frit (11) and applied to the frit on the window is a bead of adhesive (12). The bead of adhesive (12) is disposed about the periphery of the window (10) such that it forms a continuous bead of adhesive (12) which is capable of completely sealing around the periphery of the window and bonding to a structure (13), such as a frame defining a window opening of an automotive vehicle.

FIG. 2 also features a patterned conductor (14) according to the teachings of the present invention, such as for use as a window defogger, an antenna or both. The pattern shown is illustrative and not intended as limiting. The pattern may take any of a variety of different configurations. For example, the pattern may include segments that are generally linear, curved, include a plurality of substantially parallel segments, include one or more ziz-zags, one or more waveforms, one or more spirals, one or more serpentine paths, be vertically disposed, be horizontally disposed, be inclined, or any combination thereof. The pattern may include one or more combinations of serial electrical paths, parallel electrical paths, or both. The pattern may also be adapted for including or otherwise interfacing with one or more suitable buss bars, such as disclosed in U.S. Pat. No. 7,129,444, incorporated by reference, which may be fabricated from the conductive composite or another material. The pattern may also feature suitable electrical contacts for allowing electrical communication from an energy source (e.g. source of electricity, thermal energy, or both).

The adhesive bead located about the periphery of the window can be any known adhesive bead useful in bonding windows into structures. In one embodiment, the adhesive can be an isocyanate functional, siloxy functional or combination of isocyanate and siloxy functional adhesive which cures when exposed to moisture. The system of the invention can utilize any isocyanate functional adhesive which is designed for bonding to non-porous surfaces such as metal, coated plastic and/or glass. Examples of useful adhesive systems are disclosed in U.S. Pat. No. 4,374,237, U.S. Pat. No. 4,687,533, U.S. Pat. No. 4,780,520, U.S. Pat. No. 5,063,269, U.S. Pat. No. 5,623,044, U.S. Pat. No. 5,603,798, U.S. Pat. No. 5,852,137, U.S. Pat. No. 5,976,305, U.S. Pat. No. 5,852,137, U.S. Pat. No. 6,512,033, relevant portions incorporated herein by reference. Examples of commercial adhesives which may be used herein are BETASEAL™ 15630N, 15625N, 15845N adhesives available from The Dow Chemical Company. EFBOND™ windshield adhesives available from Eftec, WS151™, WS212™ adhesives available from Yokohama Rubber Company, and SIKAFLEX™ adhesives available from Sika Corporation.

It is contemplated that the adhesive may be based upon one or more of polymeric component (e.g., an isocyanate terminated prepolymer or other polymer), and which may include a pigment, a catalyst (e.g., a catalyst including Morpholine, 4,4'(oxydi-2,1-ethanediyl)bis(DMDEE)), or other ingredient (e.g., filler, such as clay, one or more silanes (e.g., an epoxy silane)) and employed as OEM adhesives, aftermarket adhesives, otherwise, or any combination thereof. Accordingly, a modified silicone (MS) polymer based adhesive such as Kaneka adhesives may be utilized. One type of Kaneka adhesive may include one or more of SAX 400 polymer, Siliquest (A-1170), carbon black, U220 tin catalyst, UV & heat stabilizer package, the like, or otherwise.

Another adhesive such as Betaseal U-418 (HV) may be utilized being formed from a mixture of one or more of isocyanate terminated prepolymer, carbon black, DMDEE catalyst (e.g.), the like, or otherwise and combinations thereof. Additionally, another adhesive such as Betaseal Express may be utilized and formed from a mixture of one or more of isocyanate terminated prepolymer, carbon black and clay, DMDEE/Bismuth Octiate, 0.25% Silquest A-187 (epoxy silane), the like, or otherwise and combinations thereof. Furthermore, another adhesive such Betaseal One may be utilized and formed from a mixture of one or more of isocyanate terminated prepolymer, polyester based prepolymer, carbon black and clay, DMDEE/Bismuth Octoate, 0.25% Silquest A-187 (epoxy silane), the like, or otherwise and combinations thereof.

Another aspect of the invention also contemplates a step of recycling a substrate including a conductive composite thereon. The composite can be removed from the substrate and the conductive material reclaimed, the substrate material reclaimed or both.

The invention herein may also be employed in combination with one or both of the teachings of U.S. Provisional Application No. 60/870,643, (filed Dec. 19, 2006), entitled "Encapsulated Panel Assemblies and Methods for Making Same"), the contents of which are hereby incorporated by reference in their entirety, U.S. application Ser. No. 11/958,983, filed Dec. 18, 2007, entitled "Encapsulated Panel Assemblies and Methods for Making Same"), the contents of which are hereby incorporated by reference in their entirety, U.S. Provisional Application No. 60/870,641, (filed Dec. 19, 2006), entitled "Adhesion Promotion Additives and Methods For Improving Coating Compositions", the contents of which are hereby incorporated by reference in their entirety, U.S. application Ser. No. 11/959,107, filed Dec. 18, 2007, entitled "Adhesion Promotion Additives and Methods For Improving Coating Compositions", the contents of which are hereby incorporated by reference in their entirety, or U.S. Provisional Application No. 61/0145,547 (filed Dec. 18, 2007, by Baikerikar et al., entitled "Protective Coating For Window Glass Having Enhanced Adhesion To Glass Bonding Adhesives," the contents of which are hereby incorporated by reference in their entirety.

Substrates treated in accordance with the present invention are capable of performing satisfactorily in accordance with at least one, and more preferably both of SAE J1885 and SAE J953. For example, an automotive window (e.g., a backlight) incorporating the conductive composite herein is able to remove moisture and/or frost from the interior surface of the transparent panel at a temperature below 0° C., (e.g., at about −18° C.). It also preferably remove moisture and/or fog from the interior surface of the transparent panel at a temperature above 0° C. (e.g., about 4° C.). In one embodiment, (for example, one using conductive composite segments that are generally parallel to each other and space about 20 to about 30 mm apart), the time for such moisture, fog and/or frost removal from at least about 75% of the viewing area of the window, following the protocol of SAE J953 is less than about 30 minutes, and more preferably less than about 15 minutes, and still more preferably less than about 7 minutes (e.g., about 5 minutes or less).

Example 1

The following Tables 1 and 2 illustrate preparation of an example of a conductive composite material in accordance with the present invention. The ingredients of Table 1 are mixed as described to form the matrix, and then combined with the ingredients of Table 2 such that the composition of Table 1 comprises about 20 weight percent of the resulting composite. The resulting composite is cured by exposure to ultraviolet radiation.

TABLE 1

Add the following to a Max 60 cup:

| Component | Grams | Wt. % |
|---|---|---|
| SR 9003 propoxylated neopentyl glycol diacrylate | 11.82 | 18.67 |
| SR 506D isobornyl acrylate | 2.5 | 3.95 |
| SR 9020HP propoxylated glycerol triacrylate | 5 | 7.90 |
| PTZ Phenothiazine (inhibitor) | 0.1 | 0.16 |
| Vinyltrimethoxysilane (moisture scavenger) | 1 | 1.58 |
| ESACURE KTO46 photoinitiator | 5 | 7.90 |
| ESACURE TZT photoinitiator | 3 | 4.74 |
| FOAMBLAST 20F silicone defoamer | 0.3 | 0.47 |
| BYK UV 3510 polydimethylsiloxane wetting agent | 0.1 | 0.16 |
| Speed-mix for 5 min at 3000 RPM | | |
| CN 983 Aliphatic urethane diacrylate | 15 | 23.69 |
| 1:1 MOL ADDUCT OF SR 9003: DYN 1122 | 15 | 23.69 |
| Speed-mix for 5 min at 3000 RPM | | |
| Acrylic acid | 4.5 | 7.11 |
| Speed-mix for 5 min at 3000 RPM | | |
| TOTAL = | 63.3200 | 100.00 |

TABLE 2

Add the following to MAX 20 CUP:

| Component | Grams | Wt. % |
|---|---|---|
| Above clear binder composition | 2 | 20 |
| Silver flake (Aldrich) | 4 | 40 |
| Silver powder (Aldrich) | 4 | 40 |
| Speed-mix for 5 min at 3000 RPM - 2 times! | | |
| TOTAL = | 10 | 100 |

The materials are applied in a 1 mm width along a 75 mm length to a thickness of about 20 microns. Resistance measurements are taken and converted to resistivity (1/conductivity) by the equation: Resistivity=(resistance×width×thickness)/length. The resulting materials exhibit at about 23° C. a resistivity (Ohm-m) of $1395 \times 10^{-8}$ immediately after UV curing and $737 \times 10^{-8}$ four days after curing, with substantially no change in resistivity thereafter. When subjected to boiling water for a period of 6 days, substrates coated with the resulting materials show no coating failure or loss of adhesion. When the resulting materials are subjected to a further heating step after UV curing, a resistivity of about $230 \times 10^{-8}$ Ohm-m is observed.

Example 2

The following Tables illustrate the preparation of an example of a conductive composite material in accordance with the present invention. This example illustrates a composition formed generally by the steps of mixing monomers (optionally in the presence of wetting agents), adding a conductive material thereto, followed by adding a photoinitiator, and optionally an organofunctional silane. Like results are expected for concentrations within about plus or minus 10% of the stated values.

TABLE 3

Add the following to a Max 60 cup:

| Component | Grams | Wt. % |
|---|---|---|
| Isobornyl acrylate (SR 506, Satomer) | 5.99 | 5.99 |
| Tripropylene glcol diacrylate (SR306, Sartomer) | 2.83 | 2.83 |
| Acrylic acid | 2.51 | 2.51 |
| Aliphatic urethane acrylate (CN985B88 and CN964A85, Sartomer) | 9.96 | 9.96 |
| Polyether modified polydimethylsiloxane (BYK UV 3510, BYK-Chemie) | 0.15 | 0.15 |
| Speed-mix at 1000 to 1500 RPM for 5 mins | | |
| Repeat speed-mix at 1000 to 1500 RPM for mins | | |
| Total | 21.44 | 21.44 |

To the cup of mixed ingredients from Table 3, the conductive material is added.

TABLE 4

Add the following to the "Max 60 cup"

| Component | Grams | Wt. % |
|---|---|---|
| Silver (Silver powder, Aldrich) | 37.5 | 37.5 |
| Silver (Silver flake, Aidrich) | 37.5 | 37.5 |
| modified Silica (AEROSIL R7200, Degussa) | 0.02 | 0.02 |
| Stir by hand the liquid resin formulation and the silver with a wooden tongue depressor to wet out fillers with the resin | | |
| Then mix the formulation at 1500 RPM for 10 mins | | |
| Total | 75.02 | 75.02 |

The resulting mixture of Table 3 and Table 4 is further mixed with the photoinitiator.

TABLE 6

Add the photoinitiators to the formulation

| Component | Grams | Wt. % |
|---|---|---|
| Alpha hydroxy ketone photoinitiator (IRGACURE 184, Ciba) | 0.43 | 0.43 |
| Alpha amines ketone photoinitiator (IRGACURE 369, Ciba) | 0.86 | 0.86 |
| Mono acryl phosphine oxide photoinitiator (LUCIRIN TPO, BASF) | 0.11 | 0.11 |
| Mix with a vortex mixer for 10 mins to dissolve the photoinitiators | | |
| Add the following | | |
| Bis(3-trimethoxysilylpropyl) amine (SILQUEST A-1170, GE Silicones) | 2.15 | 2.15 |
| Continue mixing with a vortex mixer for 10 more mins | | |
| Total | 3.55 | 3.55 |

In the above description of Example 2, the adhesion promoter, Bis(3-trialkoxysilylpropyl) amine, was added last. However in a manufacturing environment, it may be preferable to first form a Michael addition product between an acrylate (from a monomer or oligomer), and the adhesion promoter, (Bis(3-trialkoxysilylpropyl) amine), and then add the reactive diluents, (isobornyl acrylate and the tripropylene glycol diacrylate) and adding the acid moiety (acrylic acid) last, to form the matrix composition.

The ingredients of Tables 3, 4, and 5 are combined to form a resulting composite that includes a matrix portion and a conductive component. For example, the ingredients of Table 3 are mixed as described to form part of the matrix, the matrix is then speed-mixed. The conductive components from Table 4 are then added to the matrix and then stirred by hand, followed by speed mixing the formulation. The photoinitiators from Table 5 are added to the formulation and mixed to dissolve the photoinitiators. After mixing the formulation, the remaining ingredients from Table 5 are added and a final mixing is applied to the resulting mixture. The resulting composite is cured by exposure to ultraviolet radiation.

The coating application for Example 2 is as follows: Soda lime float glass substrates from Cat-I Manufacturing, (4 inches×4 inches×5 mm thick), were cleaned with an isopropanol-soaked cotton wipe to remove any surface contaminants prior to applying the coating. After cleaning the glass substrates, the coating composition was applied on the "tin-side" of the glass substrates, (the "tin-side" of the glass substrates is the side that shines light blue when exposed to a fluorescent lamp), using a #15 wire wound rod to yield a dry film coating thickness of ~30 microns. After a contact time of 1 minute, the coating was UV-cured in air in less than 10 seconds with one pass at 10 feet/minute using a 600 W/inch Fusion D bulb, (Fusion UV System) and 1.5 inch lamp-to-part distance.

Specific irradiance and dosage conditions are measured with a Power Puck radiometer from EIT, Inc. Specific irradiance and dosage conditions are shown in Table 6:

TABLE 6

| | | |
|---|---|---|
| UVA Irradiance = 3730 mW/cm$^2$ | UVA Dosage = 3835 mJ/cm$^2$ | UVA = 320-390 nm |
| UVB Irradiance = 1136 mW/cm$^2$ | UVB Dosage = 1161 mJ/cm$^2$ | UVB = 280-320 nm |
| UVC Irradiance = 67 mW/cm$^2$ | UVC Dosage = 65 mJ/cm$^2$ | UVC = 250-260 nm |
| UVV Irradiance = 2319 mW/cm$^2$ | UVV Dosage = 2352 mJ/cm$^2$ | UVV = 395-445 nm |

After UV curing, the coating is hard and scratch resistant.

The coating testing occurred Seventy-Two hours after UV curing; the coated glass samples were subjected to the following tests as shown in Table 7:

TABLE 7

| | |
|---|---|
| Resistivity | Used to determine the resistivity/conductivity of the coating |
| Micro-Indentation | Used to determine Universal hardness, Vickers hardness, and Modulus of coating |
| Pencil Hardness | Used to determine Pencil Hardness |
| 100° C. Boiling Water Immersion | Used to assess the water resistance of the coating |

The results of the coating testing are shown in Table 8:

TABLE 8

| | |
|---|---|
| Resistivity | 0.6-1.5 Ω cm |
| Micro-Indentation | 300 N/mm$^2$ |
| Modulus | 7 GPa |
| Cross-Hatch/Tape-Peel Adhesion | Passes |
| 100° C. Boiling Water Immersion | No delamination after 14 days |

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the invention. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes.

References to an acrylic or (meth)acrylic (or derivative terms such as "acrylate") contemplate meth-acrylics and acrylics (and corresponding derivative terms). Ingredients discussed herein may form part of the resulting composition. However, they also may form part of the adhesion promotion additive. For example, it is possible that the adhesion promotion additive is a vehicle for delivering an ingredient into an admixture for forming the resulting composition. For some embodiments, one or more of the stated concentration amounts disclosed herein for the matrix may also be employed as the concentration amounts of the overall composite and vice versa.

What is claimed is:

1. A conductive article, comprising:
   a. a substrate;
   b. a conductive composite including a conductive material in a matrix that includes:
      i) one or more film forming resins having at least one functional group capable of polymerization;
      ii) an initiator for causing the formation of free radicals or cations;
      iii) one or more compounds, which are reactive with the film forming resin and which also contain at least one acidic moiety; and
      iv) one or more adhesion promoters comprising a Michael Addition Product of an amino alkoxy silane and a compound having two or more acrylate groups the reaction product having 4 or greater alkoxy silane groups, at least one unsaturated group and all of the amine groups are tertiary.

2. The article of claim 1, wherein the substrate is selected from a glass, a plastic, coated plastic, metal, or any combination thereof.

3. The article of claim 2, wherein the one or more film forming resins includes one or more aliphatic urethane acrylate oligomers, one or more aromatic urethane acrylates, one or more epoxy acrylates, one or more melamine acrylates, one or more polyester acrylates, one or more polyether acrylates, one or more silicone acrylates one or more dendritic acrylates, one or more polybutadiene acrylates, one or more amine acrylates, one or more acrylic acrylates, one or more metallic acrylates, one or more amido acrylates, one or more chlorinated polyester acrylates, one or more allylic oligomers, one or more anhydride/carboxylic acid-containing aromatic acid acrylate/methacrylate half ester oligomers, one or more hyperbranched acrylates, one or more imide/ester/amide-containing acrylates self-initiating oligomers, one or more acrylated phenoxy oligomers, one or more acrylamidomethyl substituted cellulose esters, one or more dual-functional acrylated oligomers, one or more spiro-ortho carbonate esters, or any mixture thereof.

4. The article of claim 3, wherein the initiator includes one or more alpha hydroxyl ketones, one or more alpha amino ketones, one or more phosphine oxides, one or more phenyl glyoxylates, one or more thioxanthones, one or more benzophenones, one or more oxime esters, one or more benzyldimethyl ketals, or any mixture thereof.

5. The article of claim 1, wherein the compounds reactive with the film forming resins containing at least one acidic moiety are selected from the group of methacrylic acids, acrylic acids, acrylated phosphate acid esters, mono-2-(methacryloxy)ethyl maleate, mono-2-(methacryloyloxy)ethyl maleate, or phosphoric monoacrylate, maleic acids, itaconic acids, vinyl phosphonic acid, 2-sulfoethylmethacrylate, beta-carboxyethyl acrylate, 3-butenoic acid, 4-pentenoic acid, acrylamido glycolic acid, crotonic acid, tiglic acid, 2-(Trifluoromethyl)acrylic acid, dimethylacrylic acid, undecylenic acid, —and any mixture thereof.

6. The article of claim 5, wherein the at least one acidic moiety is unsaturated.

7. The article of claim 1, wherein the matrix includes:
   a. from about 10 to about 70 parts by weight of the one or more of the film forming resin;
   b. from about 2 to about 30 parts by weight of one or more reactive diluents;
   c. from about 1 to about 30 parts by weight of the one or more adhesion promoters;
   d. from about 1 to about 10 parts by weight of the one or more compounds containing at least one acidic moiety; and
   e. from about 2 to about 20 parts by weight of one or more catalysts or initiators;
   wherein the composition contains 100 parts.

8. The article of claim 7 wherein the matrix includes at least one acidic moiety comprising one or more carboxylic acid moieties, one or more phosphonic acids, one or more sulfonic acids, or any mixture thereof, and a high molecular weight Michael adduct having multiple alkoxysilanes.

9. The article of claim 7, wherein the one or more reactive diluents includes one or more isobornyl acrylates, one or more tripropylene glycol diacrylates, one or more 2(2-ethoxyethoxy) ethyl acrylates, one or more 2-phenoxyethyl acrylates, one or more hydroxyethyl acrylates, one or more hexanediol diacrylates, one or more nonanediol diacrylates, one or more butylene glycol diacrylates, one or more tricyclodecane dimethanol diacrylate, one or more propoxylated neopentyl glycol diacrylates, one or more butanediol diacrylates, one or more cyclohexanedimethanol diacrylates, one or more cis/trans 1,3/1,4 cyclohexanedimethanol diacrylates, one or more alkoxylated cyclohexanedimethanol diacrylates, one or more tetraethylene glycol diacrylates, one or more triethylene glycol diacrylates, one or more dipropylene glycol diacrylates, one or more diethylene glycol diacrylates, one or more 3,3,5-trimethylcyclohexyl acrylates, one or more cyclic trimethylolpropane formal acrylates, one or more propoxylated glyceryl triacrylates, one or more ditrimethylolpropane tetra acrylates, one or more tris(2-hydroxyethyl)isocyanurate triacrylates, one or more trimethylolpropane triacrylates, one or more alkoxylated trimethylolpropane triacrylates, or any mixture thereof.

10. The article of claim 9, further comprising one or more of fluorosilanes, fluorinated additives, polybutadiene acrylates, silylated polymers, titanates, zirconates, zircon-aluminates, silane-treated fillers, hindered amine light stabilizers, ultraviolet absorbers, antioxidants, vinyltrimethoxysilanes, oligomeric vinyl trimethoxysilanes, triethyl orthoformates, triethyl orthoacetates, molecular sieve powders, polyether modified polydimethylsiloxanes, modified silica, or any mixture thereof.

11. The article of claim 7, wherein the substrate is a window and the composite defines a pattern used on the window as at least one of a window defogger or an antenna, and a coating about the periphery of the window.

12. An article according to claim 1 wherein the Michael Addition Product contains 6 or greater alkoxy silane groups.

13. An article according to claim 1 wherein the relative amounts in parts by weight of the conductive material relative to the matrix are greater than about 2:1.

14. An article according to claim 1 wherein the conductive composite contains conductive material in an amount of at least about 50% by weight of overall conductive composite.

15. A conductive composition, comprising a conductive material in a matrix that includes:
   i) one or more film forming resins having at least one functional group capable of polymerization;
   ii) an initiator for causing the formation of free radicals or cations;
   iii) one or more compounds, which are reactive with the film forming resin and which also contain at least one acidic moiety; and
   iv) one or more adhesion promoters comprising a Michael Addition Product of an amino alkoxy silane and a compound having two or more acrylate groups the reaction product having 4 or greater alkoxy silane groups, at least one unsaturated group and all of the amine groups are tertiary.

16. The composition of claim 15, wherein the one or more film forming resins includes one or more aliphatic urethane acrylate oligomers, one or more aromatic urethane acrylates, one or more epoxy acrylates, one or more melamine acrylates, one or more polyester acrylates, one or more polyether acrylates, one or more silicone acrylates one or more dendritic acrylates, one or more polybutadiene acrylates, one or more amine acrylates, one or more acrylic acrylates, one or more metallic acrylates, one or more amido acrylates, one or more chlorinated polyester acrylates, one or more allylic oligomers, one or more anhydride/carboxylic acid-containing aromatic acid acrylate/methacrylate half ester oligomers, one or more hyperbranched acrylates, one or more imide/ester/amide-containing acrylates self-initiating oligomers, one or more acrylated phenoxy oligomers, one or more acrylamidomethyl substituted cellulose esters, one or more dual-functional acrylated oligomers, one or more spiro-ortho carbonate esters, or any mixture thereof.

17. The composition of claim 16, wherein the initiator includes one or more alpha hydroxyl ketones, one or more alpha amino ketones, one or more phosphine oxides, one or more phenyl glyoxylates, one or more thioxanthones, one or more benzophenones, one or more oxime esters, one or more benzyldimethyl ketals, or any mixture thereof.

18. The composition of claim 15, wherein the compounds reactive with the film forming resin and containing at least one acidic moiety are selected from the group of methacrylic acids, acrylic acids, acrylated phosphate acid esters, mono-2-(methacryloxy)ethyl maleate, mono-2-(methacryloyloxy) ethyl maleate, or phosphoric monoacrylate, maleic acids, itaconic acids, vinyl phosphonic acid, 2-sulfoethylmethacrylate, beta-carboxyethyl acrylate, 3-butenoic acid, 4-pentenoic acid, acrylamido glycolic acid, crotonic acid, tiglic acid, 2-(Trifluoromethyl)acrylic acid, dimethylacrylic acid, undecylenic acid, and any mixture thereof.

19. The composition of claim 18, wherein the at least one acidic moiety is unsaturated.

20. The composition of claim 15, wherein the matrix includes:
   b. from about 10 to about 70 parts by weight of the one or more of the film forming resin;
   c. from about 2 to about 30 parts by weight of one or more reactive diluents;

d. from about 1 to about 30 parts by weight of the one or more of an adhesion promoter;
e. from about 1 to about 10 parts by weight of the one or more compounds containing at least one acidic moiety; and
f. from about 2 to about 20 parts by weight of one or more catalysts or initiators;
wherein the composition contains 100 parts.

21. The composition of claim 20, wherein the composition is one cured upon exposure to ultraviolet light, an electron beam, or both.

22. The composition of claim 21, wherein the matrix includes at least one acidic moiety comprising one or more carboxylic acid moieties, one or more phosphonic acids, one or more sulfonic acids, or any mixture thereof, and a high molecular weight Michael adduct having multiple alkoxysilanes.

23. The a composition of claim 20, wherein the one or more reactive diluents includes one or more isobornyl acrylates, one or more tripropylene glycol diacrylates, one or more 2(2-ethoxyethoxy) ethyl acrylates, one or more 2-phenoxyethyl acrylates, one or more hydroxyethyl acrylates, one or more hexanediol diacrylates, one or more nonanediol diacrylates, one or more butylene glycol diacrylates, one or more tricyclodecane dimethanol diacrylate, one or more propoxylated neopentyl glycol diacrylates, one or more butanediol diacrylates, one or more cyclohexanedimethanol diacrylates, one or more cis/trans 1,3/1,4 cyclohexanedimethanol diacrylates, one or more alkoxylated cyclohexanedimethanol diacrylates, one or more tetraethylene glycol diacrylates, one or more triethylene glycol diacrylates, one or more dipropylene glycol diacrylates, one or more diethylene glycol diacrylates, one or more 3,3,5-trimethylcyclohexyl acrylates, one or more cyclic trimethylolpropane formal acrylates, one or more propoxylated glyceryl triacrylates, one or more ditrimethylolpropane tetra acrylates, one or more tris(2-hydroxyethyl)isocyanurate triacrylates, one or more trimethylolpropane triacrylates, one or more alkoxylated trimethylolpropane triacrylates, or any mixture thereof.

24. The composition of claim 20, further comprising one or more of fluorosilanes, fluorinated additives, polybutadiene acrylates, silylated polymers, titanates, zirconates, zirconaluminates, silane-treated fillers, hindered amine light stabilizers, ultraviolet absorbers, antioxidants, vinyltrimethoxysilanes, oligomeric vinyl trimethoxysilanes, triethyl orthoformates, triethyl orthoacetates, molecular sieve powders, polyether modified polydimethylsiloxanes, modified silica, or any mixture thereof.

25. A composition according to claim 15 wherein the Michael Addition Product contains 6 or greater alkoxy silane groups.

26. A composition according to claim 15 wherein the relative amounts in parts by weight of the conductive material relative to the matrix are greater than about 2:1.

27. A composition according to claim 15 wherein the conductive composite contains conductive material in an amount of at least about 50% by weight of the overall conductive composite.

* * * * *